United States Patent
Sweeney et al.

(10) Patent No.: US 11,212,316 B2
(45) Date of Patent: Dec. 28, 2021

(54) CONTROL MATURITY ASSESSMENT IN SECURITY OPERATIONS ENVIRONMENTS

(71) Applicant: Fortinet, Inc., Sunnyvale, CA (US)

(72) Inventors: Matthew Stephen Sweeney, Rochester, NY (US); Casey Corcoran, Baltimore, MD (US); John Camp, Baltimore, MD (US); Chris Wacker, Baltimore, MD (US); Brit Wanick, Baltimore, MD (US); Derek Gabbard, Baltimore, MD (US)

(73) Assignee: Fortinet, Inc., Sunnyvale, CA (US)

( * ) Notice: Subject to any disclaimer, the term of this patent is extended or adjusted under 35 U.S.C. 154(b) by 302 days.

(21) Appl. No.: 16/240,470

(22) Filed: Jan. 4, 2019

(65) Prior Publication Data

US 2019/0207981 A1 Jul. 4, 2019

Related U.S. Application Data

(60) Provisional application No. 62/613,440, filed on Jan. 4, 2018.

(51) Int. Cl.
*H04L 29/06* (2006.01)
*H04L 12/24* (2006.01)
(Continued)

(52) U.S. Cl.
CPC .......... *H04L 63/20* (2013.01); *G06F 21/577* (2013.01); *G06Q 10/0635* (2013.01);
(Continued)

(58) Field of Classification Search
CPC ..... H04L 63/20; H04L 67/12; H04L 63/1416; H04L 41/06; H04L 63/0227;
(Continued)

(56) References Cited

U.S. PATENT DOCUMENTS

| 5,765,138 A | * | 6/1998 | Aycock | ............ | G06Q 10/06313 |
| | | | | | 705/7.23 |
| 7,752,125 B1 | * | 7/2010 | Kothari | .................. | G06Q 20/40 |
| | | | | | 705/38 |

(Continued)

FOREIGN PATENT DOCUMENTS

| AU | 2018331397 A1 * | 4/2020 | ........... G06Q 10/101 |
| CN | 105929756 A * | 9/2016 | ........... G06Q 20/202 |
| WO | 2013/166126 | 11/2013 | |

OTHER PUBLICATIONS

Merriam-Webster, "temporal", 2020 (Year: 2020).*
(Continued)

*Primary Examiner* — Ondrej C Vostal
(74) *Attorney, Agent, or Firm* — HDC Intellectual Property Law, LLP

(57) ABSTRACT

Method and system embodiments for assessing control maturity in security operations environments are described. According to some embodiments, the method facilitates a nonintrusive, automated means to configure and detect security controls installed in an Information Technology (IT) environment. The system verifies that these controls function as expected over a specified period of time and then maps each security control to a cell in a matrix of operational functions crossed with asset classes. The system captures metrics for security control activity that are displayed in the matrix to facilitate an assessment of security control architectural maturity. The system automatically generates visual and textual reports that provide recommendations to improve cybersecurity by enhancing existing and adding new controls, specify a suggested timeline for introducing those controls, and document gaps in compliance. The reports include automated remediation recommendations per compliance framework, including the ability to apply custom frameworks.

40 Claims, 17 Drawing Sheets

(51) Int. Cl.
    *H04L 12/26*     (2006.01)
    *G06Q 10/06*     (2012.01)
    *G06F 21/57*     (2013.01)

(52) U.S. Cl.
    CPC ........ *H04L 41/069* (2013.01); *H04L 41/0686* (2013.01); *H04L 41/0816* (2013.01); *H04L 41/0883* (2013.01); *H04L 41/142* (2013.01); *H04L 41/145* (2013.01); *H04L 43/045* (2013.01); *H04L 43/06* (2013.01); *H04L 63/1425* (2013.01); *H04L 63/1433* (2013.01); *H04L 63/1441* (2013.01); *G06F 2221/034* (2013.01)

(58) Field of Classification Search
    CPC ............ H04L 63/1408; G06F 11/3072; G06F 21/554; G06F 21/577; G06F 21/51; H04N 7/183
    USPC ............................................................. 726/1
    See application file for complete search history.

(56) References Cited

U.S. PATENT DOCUMENTS

| | | | | |
|---|---|---|---|---|
| 8,256,004 B1* | 8/2012 | Hill | ................. | G06Q 10/00 726/25 |
| 8,595,837 B2* | 11/2013 | Antony | ................. | G06F 21/552 726/23 |
| 9,436,820 B1* | 9/2016 | Gleichauf | ................. | H04L 63/02 |
| 9,548,987 B1* | 1/2017 | Poole | ................. | H04L 63/1408 |
| 9,646,482 B1* | 5/2017 | Herman | ................. | G08B 25/008 |
| 10,057,285 B2* | 8/2018 | Choudhary | ........ | G06Q 10/0635 |
| 10,249,069 B1* | 4/2019 | Kerzner | ................. | G08B 5/22 |
| 10,262,133 B1* | 4/2019 | Cohen | ................. | H04L 41/145 |
| 10,601,872 B1* | 3/2020 | Natarajan | ............. | H04W 12/08 |
| 11,061,946 B2* | 7/2021 | Petroni | ............. | G06F 16/9038 |
| 2007/0266422 A1* | 11/2007 | Germano | ............ | H04L 63/0263 726/1 |
| 2007/0276776 A1* | 11/2007 | Sagher | ................. | G06K 9/6254 706/25 |
| 2008/0065292 A1* | 3/2008 | Katrak | ................. | B62D 5/008 701/41 |
| 2009/0158428 A1* | 6/2009 | Wang | ................. | H04L 69/22 726/22 |
| 2009/0260086 A1* | 10/2009 | Lang | ................. | G06F 21/577 726/25 |
| 2010/0234100 A1* | 9/2010 | Gagner | ................. | G07F 17/32 463/29 |
| 2011/0161848 A1* | 6/2011 | Purcell | ................. | H04L 67/04 715/764 |
| 2011/0252479 A1* | 10/2011 | Beresnevichiene | ... | G06F 21/577 726/25 |
| 2012/0137361 A1* | 5/2012 | Yi | ................. | H04L 63/1408 726/22 |
| 2012/0188057 A1* | 7/2012 | Green | ................. | H04L 67/12 340/8.1 |
| 2015/0346066 A1* | 12/2015 | Dutta | ................. | G01M 99/008 702/183 |
| 2016/0048782 A1* | 2/2016 | Johnson | ................. | H04L 63/20 705/7.28 |
| 2017/0300690 A1* | 10/2017 | Ladnai | ................. | G06F 21/554 |
| 2018/0004948 A1* | 1/2018 | Martin | ................. | G06F 21/566 |
| 2018/0018602 A1* | 1/2018 | DiMaggio | ............. | G06N 20/00 |
| 2018/0020021 A1* | 1/2018 | Gilmore | ............. | H04L 63/1408 |
| 2018/0027006 A1* | 1/2018 | Zimmermann | ..... | H04L 63/0245 726/11 |
| 2018/0053064 A1* | 2/2018 | Lim | ................. | H04N 7/183 |
| 2018/0234434 A1* | 8/2018 | Viljoen | ................. | G06F 21/554 |
| 2018/0309772 A1* | 10/2018 | Song | ................. | H04L 63/1441 |
| 2019/0065178 A1* | 2/2019 | Sloane | ................. | H04L 41/0893 |
| 2019/0138538 A1* | 5/2019 | Stojanovic | ............. | G06F 16/285 |
| 2019/0228161 A1* | 7/2019 | Grindstaff, II | ........ | G06F 21/577 |
| 2020/0019553 A1* | 1/2020 | Poirel | ................. | G06F 16/24568 |
| 2020/0021620 A1* | 1/2020 | Purathepparambil | ........................ | H04L 63/145 |
| 2021/0092161 A1* | 3/2021 | Crabtree | ............. | H04L 63/1425 |

OTHER PUBLICATIONS

Burckhardt et al., "Replicated Data Types: Specification, Verification, Optimality", 2014 (Year: 2014).*
Grispos et al., "Enhancing security incident response follow-up efforts with lightweight agile retrospectives", 2017 (Year: 2017).*
He et al., "Topology Awareness on Network Damage Assessment and Control Strategies Generation", 2009 (Year: 2009).*
IAnewsletter, "Cloud Computing: Silver Lining of Storm Ahead?", "Establishing Trust in Cloud Computing", 2010 (Year: 2010).*
Merriam-Webster, "metrics", 2021 (Year: 2021).*
Mishra, "A Recursive PLS (Partial Least Squares) based Approach for Enterprise Threat Management", 2018 (Year: 2018).*
Murray et al., "Similarity analysis and data enhancement techniques using knowledge sources", JP2017-536601 A, 2017 (Year: 2017).*
Porretti et al., "A New Vision for ATM Security Management", "The Security Management Platform", 2016 (Year: 2016).*
WhatIs.com, "security event", 2021 (Year: 2021).*
International Search Report and Written Opinion, dated Apr. 17, 2019, directed to PCT/US2019/012392; 13 pages.

* cited by examiner

FIG. 15

CONTROL MATURITY ASSESSMENT IN SECURITY OPERATIONS ENVIRONMENTS

CROSS-REFERENCE TO RELATED APPLICATIONS

This application claims the benefit of U.S. Provisional Application No. 62/613,440, filed on Jan. 4, 2018, which is herein incorporated by reference in its entirety and for all purposes.

FIELD OF THE INVENTION

This application relates generally to assessing security controls in an Information Technology (IT) environment and, more specifically, to assessing security control maturity.

BACKGROUND OF THE INVENTION

As cybersecurity risks have grown over time, organizations have implemented more and more security controls to secure their Information Technology (IT) environment. In the IT domain, security controls can refer to countermeasures to avoid, detect, counteract, or reduce different types of security risks, according to some embodiments. Such countermeasures can include processes, procedures, or automation. For examples, security controls can include an authentication process that requires employees to pass multi-factor authentication before gaining access to the IT environment. Other types of security controls may relate to retaining an audit trail of access, employee cybersecurity training, incident management, cryptography for IT data and employee devices, password requirements, security testing, etc.

While implementing these security controls may better secure the IT environment, businesses often cannot efficiently assess whether the security controls are adequately performing their function with respect to security and whether the security controls in place fulfill the requirements of compliance standards that apply to various segments of their IT environment. Moreover, without the means to accurately assess the security controls in place, businesses also lack the ability to assess the current cybersecurity maturity level with respect to their security controls and how best to improve their cybersecurity posture.

The disclosures of all publications, patents, and patent applications referred to herein are each hereby incorporated by reference in their entireties. To the extent that any reference incorporated by reference conflicts with the instant disclosure, the instant disclosure shall control.

SUMMARY OF THE INVENTION

Measuring and managing security compliance requirements in the IT environment requires a consistent, quick, unobtrusive approach. To address the problems noted above, the present disclosure describes methods and systems for assessing a control maturity of security controls implemented in an Information Technology (IT) environment. In some embodiments, a system can assess the control maturity by monitoring security controls in place and displaying suggested improvements to a security posture of the IT environment over time (thereby increasing maturity of security controls in place). In some embodiments, by creating a maturity assessment without installing agents or intrusive means enables validation that controls are in place for organizational management and third parties (e.g., in third party risk management scenarios, cyber insurance control validation, and audits against compliance standards such as the CIS Top 20 or NIST 800-171). From the perspective of an auditing or cybersecurity consulting firm, obtaining measurements of security maturity and effectiveness that do not require sensitive information to be shared and enable comparison across organizations improves the intrusive approach of current systems.

In some embodiments, the described systems facilitate a non-intrusive, automated approach to configure and detect security controls installed in the IT environment. In some embodiments, each security control can be mapped to a cell in a matrix of operational functions crossed with asset classes. In some embodiments, metrics for security control activity can be calculated and mapped to corresponding operational function and asset classes to facilitate an assessment of architectural security control maturity. In some embodiments, the system automatically generates visual and textual reports that provide recommendations to improve cybersecurity such as by enhancing existing and adding new controls, specifying a suggested timeline for introducing those controls, recommending changes in control configuration, and documenting gaps in compliance. In some embodiments, the reports include automated remediation recommendations per compliance framework, including the ability to apply custom frameworks.

To address the problems noted above, the present disclosure describes methods and systems for assessing a control maturity of security controls implemented in an Information Technology (IT) environment. In some embodiments, the method includes: receiving a plurality of security events from a plurality of sensors in the IT environment; generating a plurality of enriched events corresponding to the plurality of security events, wherein each enriched event comprises metadata identifying data types associated with a security event corresponding to the enriched event; classifying each security event to a security control from a plurality of predetermined security controls based on the corresponding enriched event; calculating a plurality of activity metrics for each security control based on each classified security event; calculating the control maturity for the plurality of security controls based on the plurality of activity metrics; and providing the calculated control maturity to a user.

In some embodiments, the method includes generating a model of a security environment corresponding to the IT environment.

In some embodiments of the method, the IT environment comprises a plurality of assets associated with a plurality of network domains, and each sensor is configured to detect a type of security information associated with an asset within a network domain.

In some embodiments of the method, the metadata comprises a network ID, a network domain, a timestamp, sensor event type data, a sensor vendor type, event severity data, or security metadata associated with event assessment and security control activity calculations.

In some embodiments of the method, generating the enriched events comprises: matching a plurality of portions of the security event to a plurality of event patterns stored in an event pattern database to determine a matching event pattern; and in response to matching the plurality of portions to the event pattern, generating metadata for each matching portion based on data types specified in the event pattern.

In some embodiments of the method, the plurality of event patterns comprises a plurality of corresponding regular expressions.

In some embodiments of the method, the classifying each security event comprises: classifying each security event to a sensor vendor based on the metadata corresponding to each security event; and classifying each security event to a security control based on the sensor vendor classified for each security event.

In some embodiments of the method, classifying each security event to a security control from a plurality of predetermined security controls based on the corresponding enriched event comprises: classifying each security event to an operational function based on the security control associated with the security event; and classifying each security event as having an impact on one or more assets that are associated with the classified security control of the security event.

In some embodiments of the method, the calculating the plurality of activity metrics for each security control comprises: generating a plurality of control activity records corresponding to the plurality of security controls based on each classified security event, wherein each control activity record includes an activity count associated with a security control type; and storing the plurality of control activity records in a control activity database.

In some embodiments of the method, calculating the control maturity comprises calculating a control maturity score for a security control, and wherein calculating the control maturity score comprises: calculating a control effectiveness score (CES) that measures an effectiveness of the security control over a time period; and calculating a compliance conformance score (CCS) that measures how well compliance is being met for the security control in place.

In some embodiments of the method, calculating the control effectiveness score (CES) comprises: calculating a coverage effectiveness ratio (CER) that measures a ratio of time that the security control was active in a predefined time period; calculating an asset coverage ratio (ACR) that measures assets covered by the security control versus a total number of assets in a network domain; and calculating a business impact ratio (BIR) that computes a ratio of a total business impact relative to a maximum possible impact based on the assets covered by the security control and a business impact assigned to each asset.

In some embodiments of the method, the CES is calculated by weighting the CER by the ACR and subtracting a score calculated based on weighting an uncovered ratio by the BIR, wherein the uncovered ratio is calculated based on the ACR and represents a portion of the network domain not covered by the security control.

In some embodiments of the method, calculating the compliance conformance score (CCS) comprises: calculating an unweighted compliance conformance score that measures a ratio of compliance requirements fulfilled by the security control compared to compliance requirements that must be fulfilled over the predefined time period.

In some embodiments of the method, calculating the compliance conformance score (CCS) comprises: calculating a weighted compliance conformance that measures a ratio of compliance requirements fulfilled by the security control compared to compliance requirements that must be fulfilled over the predefined time period, wherein each compliance requirement fulfillment is weighted based on the security control.

In some embodiments of the method, providing the calculated control maturity to the user comprises: displaying a matrix of operational assets crossed with assess classes, wherein each cell in the matrix comprises one or more security controls mapped to the operational asset and the asset class corresponding to that cell; and displaying a graphical indication within each cell of the matrix to indicate a control maturity of the one or more security controls corresponding to that cell.

In some embodiments of the method, providing the calculated control maturity to the user comprises: providing to the user a report that indicates control maturity gaps with respect to a matrix of operational assets crossed with assess classes, wherein each cell in the matrix comprises one or more security controls mapped to the operational asset and the asset class corresponding to that cell.

In some embodiments, the method comprises: generating a security alert based on the calculated control maturity to notify the user of control maturity gaps or to notify the user of an abnormal change in control maturity or compliance conformance.

In some embodiments, the method comprises: detecting an indication of the abnormal change based on a plurality of rules, a heuristic, or a classifier.

In some embodiments, the method comprises: initiating an automated action based on the calculated control maturity to decrease risk and improve security resilience of the IT environment.

In some embodiments of the method, the automated action comprises reconfiguring one or more security policies.

In some embodiments, a system for assessing a control maturity of security controls in an Information Technology (IT) environment comprises one or more processors, memory, and one or more programs stored in the memory that when executed by the one or more processors cause the one or more processors to: receive a plurality of security events from a plurality of sensors in the IT environment; generate a plurality of enriched events corresponding to the plurality of security events, wherein each enriched event comprises metadata identifying data types associated with a security event corresponding to the enriched event; classify each security event to a security control from a plurality of predetermined security controls based on the corresponding enriched event; calculate a plurality of activity metrics for each security control based on each classified security event; calculate the control maturity for the plurality of security controls based on the plurality of activity metrics; and provide the calculated control maturity to a user.

In some embodiments of the system, the one or more processors are caused to generate a model of a security environment corresponding to the IT environment.

In some embodiments of the system, the IT environment comprises a plurality of assets associated with a plurality of network domains, and wherein each sensor is configured to detect a type of security information associated with an asset within a network domain.

In some embodiments of the system, the metadata comprises a network ID, a network domain, a timestamp, sensor event type data, a sensor vendor type, event severity data, or security metadata associated with event assessment and security control activity calculations.

In some embodiments of the system, to generate the enriched events, the one or more processors are caused to: match a plurality of portions of the security event to a plurality of event patterns stored in an event pattern database to determine a matching event pattern; and in response to matching the plurality of portions to the event pattern, generate metadata for each matching portion based on data types specified in the event pattern.

In some embodiments of the system, the plurality of event patterns comprises a plurality of corresponding regular expressions.

In some embodiments of the system, to classify each security event, the one or more processors are caused to: classify each security event to a sensor vendor based on the metadata corresponding to each security event; and classify each security event to a security control based on the sensor vendor classified for each security event.

In some embodiments of the system, to classify each security event to a security control from a plurality of predetermined security controls based on the corresponding enriched event, the one or more processors are caused to: classify each security event to an operational function based on the security control associated with the security event; and classify each security event as having an impact on one or more assets that are associated with the classified security control of the security event.

In some embodiments of the system, to calculate the plurality of activity metrics for each security control, the one or more processors are caused to: generate a plurality of control activity records corresponding to the plurality of security controls based on each classified security event, wherein each control activity record includes an activity count associated with a security control type; and store the plurality of control activity records in a control activity database.

In some embodiments of the system, calculating the control maturity comprises calculating a control maturity score for a security control, and wherein to calculate the control maturity score, the one or more processors are caused to: calculate a control effectiveness score (CES) that measures an effectiveness of the security control over a time period; and calculate a compliance conformance score (CCS) that measures how well compliance is being met for the security control in place.

In some embodiments of the system, to calculate the control effectiveness score (CES), the one or more processors are caused to: calculate a coverage effectiveness ratio (CER) that measures a ratio of time that the security control was active in a predefined time period; calculate an asset coverage ratio (ACR) that measures assets covered by the security control versus a total number of assets in a network domain; and calculate a business impact ratio (BIR) that computes a ratio of a total business impact relative to a maximum possible impact based on the assets covered by the security control and a business impact assigned to each asset.

In some embodiments of the system, the CES is calculated by weighting the CER by the ACR and subtracting a score calculated based on weighting an uncovered ratio by the BIR, wherein the uncovered ratio is calculated based on the ACR and represents a portion of the network domain not covered by the security control.

In some embodiments of the system, to calculate the compliance conformance score (CCS), the one or more processors are caused to: calculate an unweighted compliance conformance score that measures a ratio of compliance requirements fulfilled by the security control compared to compliance requirements that must be fulfilled over the predefined time period.

In some embodiments of the system, to calculate the compliance conformance score (CCS), the one or more processors are caused to: calculate a weighted compliance conformance that measures a ratio of compliance requirements fulfilled by the security control compared to compliance requirements that must be fulfilled over the predefined time period, wherein each compliance requirement fulfillment is weighted based on the security control.

In some embodiments of the system, to provide the calculated control maturity to the user, the one or more processors are caused to: display a matrix of operational assets crossed with assess classes, wherein each cell in the matrix comprises one or more security controls mapped to the operational asset and the asset class corresponding to that cell; and display a graphical indication within each cell of the matrix to indicate a control maturity of the one or more security controls corresponding to that cell.

In some embodiments of the system, to provide the calculated control maturity to the user, the one or more processors are caused to: provide to the user a report that indicates control maturity gaps with respect to a matrix of operational assets crossed with assess classes, wherein each cell in the matrix comprises one or more security controls mapped to the operational asset and the asset class corresponding to that cell.

In some embodiments of the system, the one or more processors are caused to: generate a security alert based on the calculated control maturity to notify the user of control maturity gaps or to notify the user of an abnormal change in control maturity or compliance conformance.

In some embodiments of the system, the one or more processors are caused to: detect an indication of the abnormal change based on a plurality of rules, a heuristic, or a classifier.

In some embodiments of the system, the one or more processors are caused to: initiate an automated action based on the calculated control maturity to decrease risk and improve security resilience of the IT environment.

In some embodiments of the system, the automated action comprises reconfiguring one or more security policies.

In some embodiments, a non-transitory computer-readable storage medium comprises instructions for assessing a control maturity of security controls in an Information Technology (IT) environment, wherein the instructions, when executed by a computer having one or more processors, cause the one or more processors to perform instructions comprising: receiving a plurality of security events from a plurality of sensors in the IT environment; generating a plurality of enriched events corresponding to the plurality of security events, wherein each enriched event comprises metadata identifying data types associated with a security event corresponding to the enriched event; classifying each security event to a security control from a plurality of predetermined security controls based on the corresponding enriched event; calculating a plurality of activity metrics for each security control based on each classified security event; calculating the control maturity for the plurality of security controls based on the plurality of activity metrics; and providing the calculated control maturity to a user.

BRIEF DESCRIPTION OF THE DRAWINGS

The foregoing summary, as well as the following detailed description of embodiments, is better understood when read in conjunction with the appended drawings. For the purpose of illustrating the present disclosure, the drawings show example embodiments of the disclosure; the disclosure, however, is not limited to the specific methods and instrumentalities disclosed. In the drawings:

FIG. 15 illustrates an example graphical user interface that displays a control maturity matrix rendered by a dashboard system, according to some embodiments;

DETAILED DESCRIPTION OF THE INVENTION

In some embodiments, the methods and systems described herein provide functionality to quickly assess and prioritize security maturity, including coverage, gaps, and recommended actions, without installing any agents or performing potentially disruptive network scans. In some embodiments, the scoring methodology enables calculating courses of actions for an automated recommendation system for security control improvements. This methodology may improve upon the current state of practice in which manual methods are followed for understanding and developing actions from these assessments. Additionally, current approaches rely are often intrusive because they rely on external scans conducted with or without the consent of organizations to generate findings for security vulnerability and threat assessments. Moreover, any recommendations from these approaches lack context regarding internal controls and security device configuration.

In some embodiments, to improve on these current approaches, a method for facilitating a non-intrusive, automated means to assess a control maturity of a plurality of security controls implemented in the environment can include receiving a plurality of security events from a plurality of sensors in the IT environment. A plurality of enriched events corresponding to the plurality of security events can be generated with each enriched event comprises metadata identifying data types associated with a security event corresponding to the enriched event. Then, each security event can be classified to a security control from a plurality of predetermined security controls based on the corresponding enriched event. The method can include calculating a plurality of activity metrics for each security control based on each classified security event and calculating the control maturity for the plurality of security controls based on the plurality of activity metrics. The calculated control maturity can be provided to a user. In some embodiments, the calculated control maturity can be transmitted in an automatically generated visual or textual report that provide recommendations to improve cybersecurity by enhancing existing and adding new controls, specify a suggested timeline for introducing those controls, and document gaps in compliance.

Figure 1:
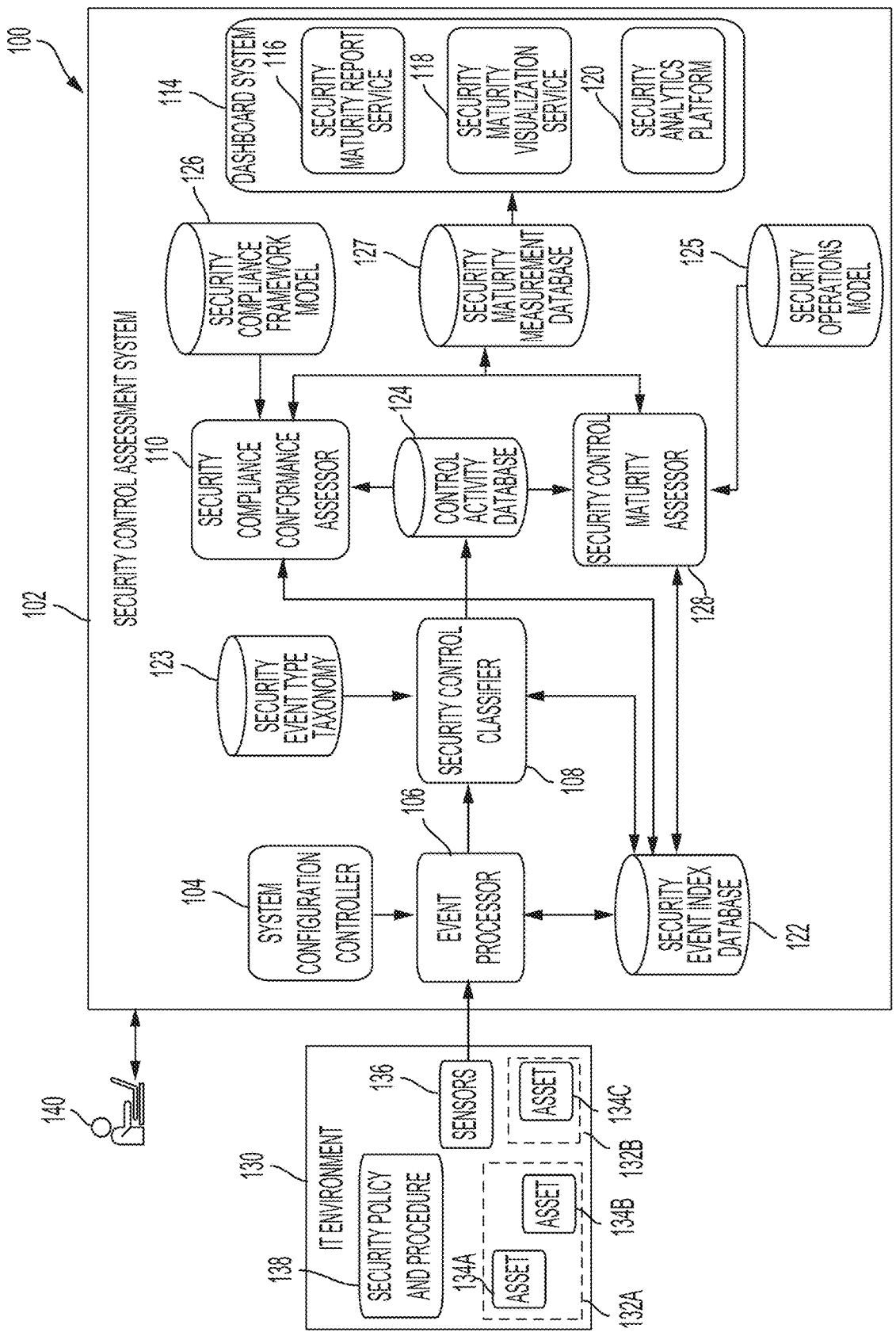
FIG. 1 illustrates a system for assessing security controls implemented in an Information Technology (IT) environment, according to some embodiments.

FIG. 1 illustrates a system 100 for assessing security controls implemented in an Information Technology (IT) environment 130, according to some embodiments. As described above, security controls refer to the countermeasures to avoid, detect, counteract, or reduce different types of security risks to assets 134A-C (e.g., computer system or business data) of IT environment 130. For example, a security control may be a preventive control associated with controlling the ways in which ways human users (e.g., network administrators, developers, end users, etc.) can and cannot interact with and/or have access to one or more of the IT appliances (e.g., assets 134A-C) and services part of the IT infrastructure.

In some embodiments, IT environment 130 includes IT infrastructure of a business whose security controls are to be assessed. As shown, IT environment 130 can include a plurality of assets 134A-C within a plurality of networks 132A-B. In some embodiments, assets 134A-C can include hardware, software, or network components. For example, hardware may include computers, computer server systems (e.g., including virtual machine farms), laptops, mobile devices (e.g., phones or tablets), data center servers, storage devices, switches, hubs, routers, etc. For example, software may include enterprise resource planning (ERP), customer relationship management (CRM), productivity applications, or other business-specific applications. For example, network components may include network enablement components, firewalls, security components, etc. Assets 134A-C may also include other infrastructure such as physical security systems, Internet-of-Things (IoT) devices, VoIP phones, or control systems.

In some embodiments, IT environment 130 can implement security policy and procedure 138 that specify the security controls being implemented to secure assets 134A-C and networks 132A-B. For example, a security policy may identify acceptable and unacceptable uses of various assets 134A-C and a security procedure may describe processes and techniques to enforce, prevent, or identify desirable or undesirable behavior. In some embodiments, IT environment 130 can include sensors 136 that detect security events from one or more of assets 134A-E. In some embodiments, a security event is an identifiable occurrence relevant to information security of IT environment 130. For example, a security event may correspond to an occurrence specified in security policy and procedure 138. Examples of sensors 136 may include security appliances such as a next-generation firewall (NGFW), a web proxy firewall (e.g., web filtering), a network intrusion detection system (NIDS), a network intrusion prevention system (NIPS), host-based anti-virus and endpoint protection software, alerts from an authentication system service (e.g., from a directory service such as Microsoft Active Directory), or a vulnerability scanning system (e.g., including analysis and sensor agent components on a host), etc. In some embodiments, the authentication system service can be implemented on a server on premise or pulled via API (application programming interface) calls to a remote server (e.g., a server in a cloud system). In some embodiments, sensors 136 can be a software component (e.g., an agent) implemented on one or more of assets 134A-E.

In some embodiments, security control assessment system 102 can be configured to assess security controls of IT environment 130 based on security events generated at IT environment 130. In some embodiments, the assessment includes an assessment of a control maturity of the security controls implemented in IT environment 130. In some embodiments, the assessment includes an assessment of whether or how much the security controls conform to security framework standards. For example, security control assessment system 102 may assess the control maturity or conformance of the security controls implemented in IT environment 130 with respect to a security framework standard specified in security policy and procedure 138. To provide these assessments, security control assessment system 102 can include the following components: a system configuration controller 104, an event processor 106, a security control classifier 108, a security compliance conformance assessor 110, a security control maturity assessor 112, and a dashboard system 114, according to some embodiments. In some embodiments, each component can include a set of computer instructions implemented on one or servers, each including one or more processors. In some embodiments, two or more components can be implemented as applications or processes on the same server.

In some embodiments, system configuration controller 104 can control configurations (e.g., parameters or rules) used by one or more of the components within security control assessment system 102. For example, system configuration controller 104 may set network configurations in a network configuration database, compliance security frameworks in security compliance framework model 126, and mappings between security controls and paired elements of an operational function and asset class in security operations model 125, or mapping between event types and security controls in security event type taxonomy 123, as will be further described in FIG. 3. In some embodiments, system configuration controller 104 can include a user interface that enables a user operating user device 140 to set the various configurations of security control assessment system 102. For example, the user may be a network administrator or an IT specialist associated with IT environment 130.

Figure 4:
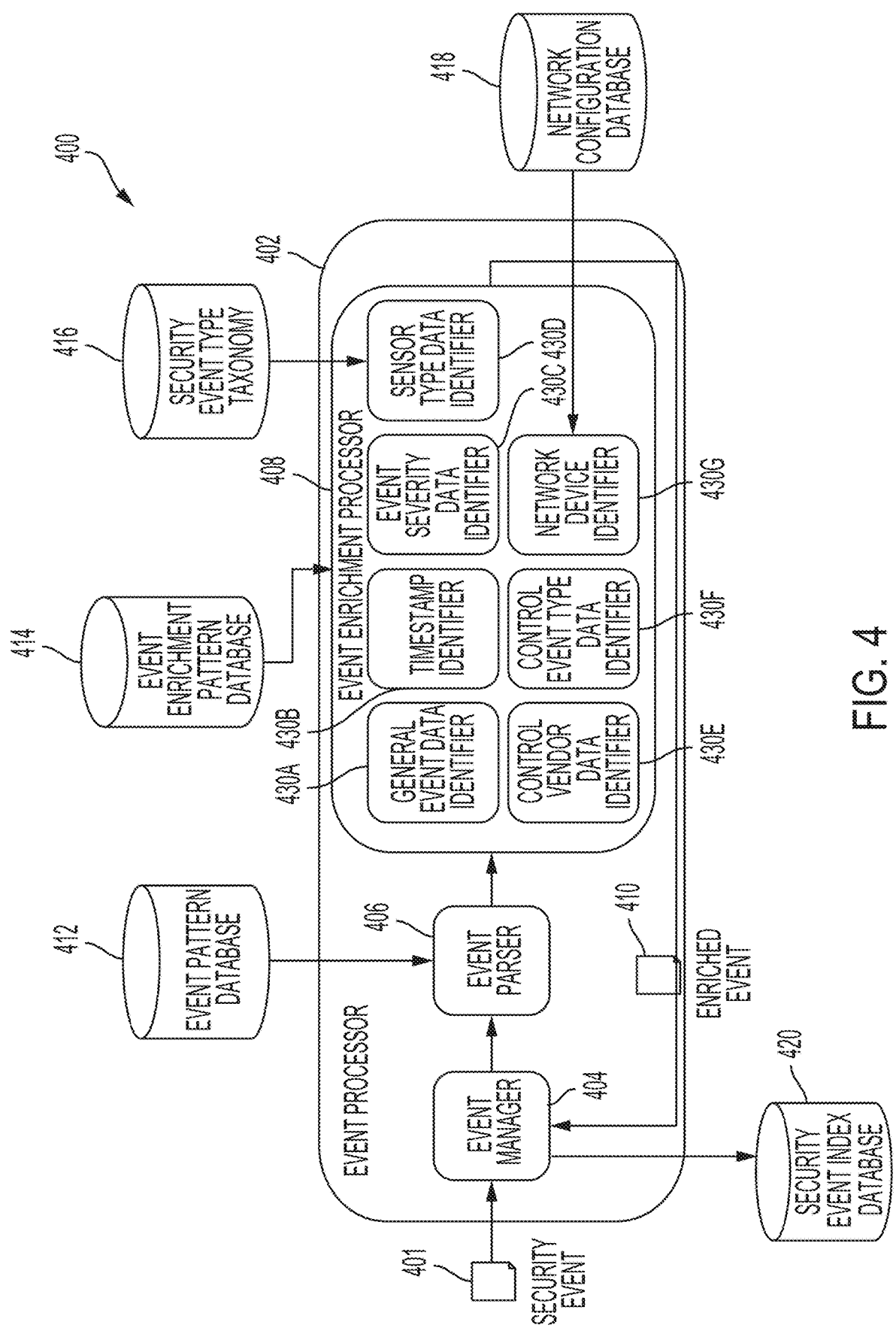
FIG. 4 illustrates a diagram showing components of an event processor in the security control assessment system, according to some embodiments.
Figure 5:
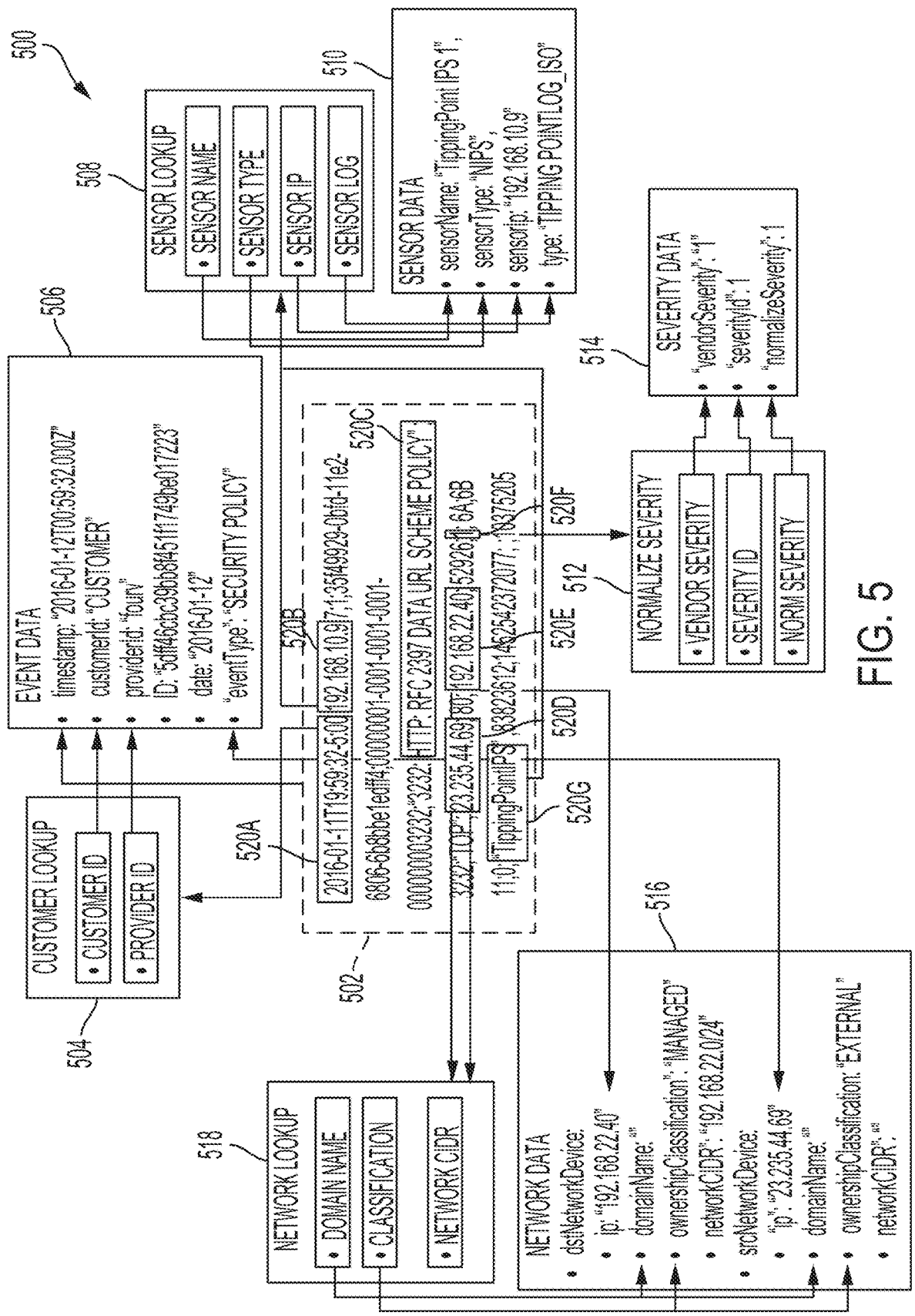
FIG. 5 illustrates a diagram showing example metadata generated for a security event, according to some embodiments.
Figure 6:
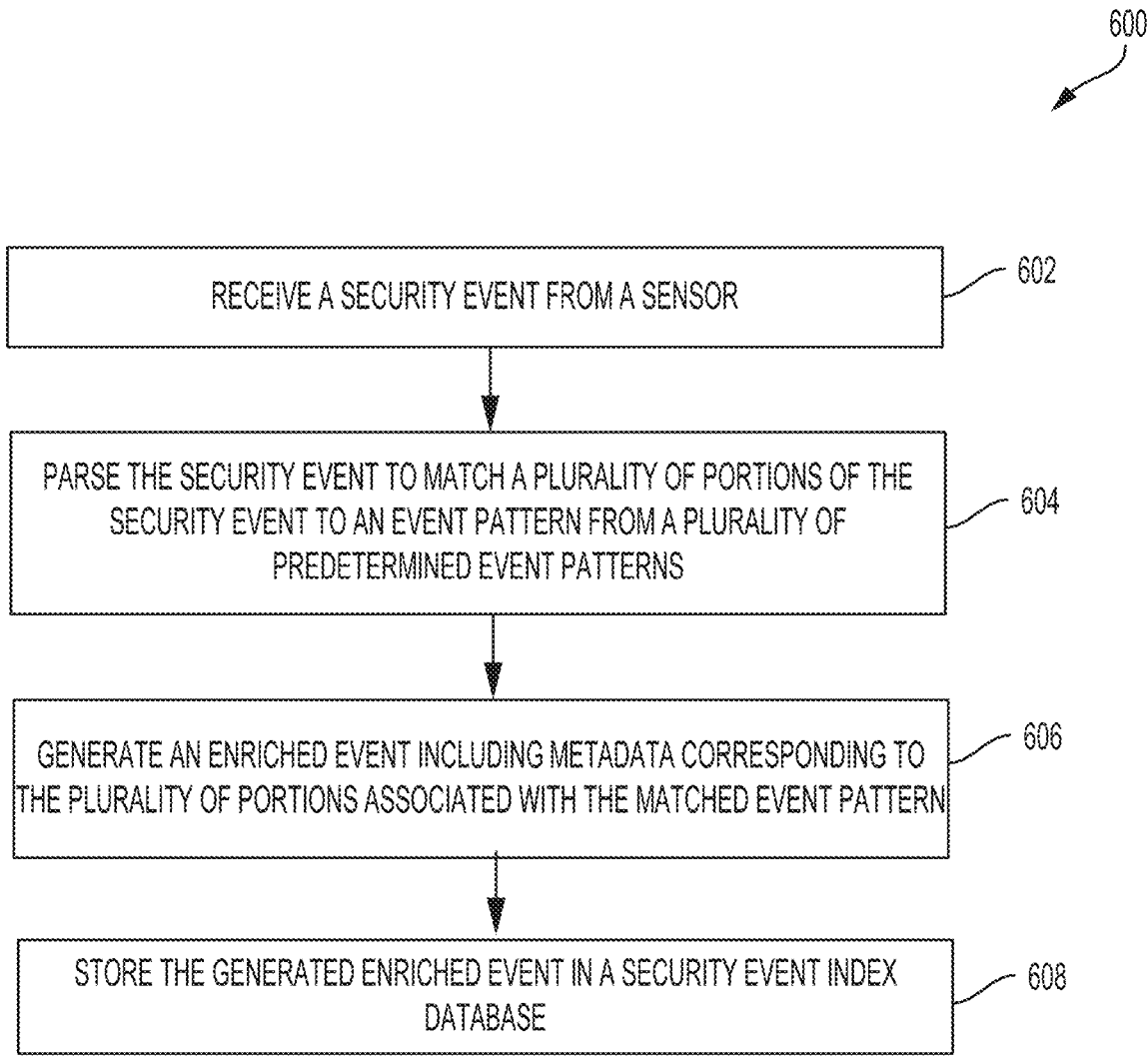
FIG. 6 illustrates a method 600 for generating an enriched event based on a security event, according to some embodiments.

In some embodiments, event processor 106 can be configured to generate enriched events based on security events received from sensors 136, as will be further described in FIGS. 4-6. In some embodiments, the enriched events include metadata generated for corresponding security events. As will be further described in FIGS. 7-8, an enriched event corresponding to a security event can be configured to be analyzed by security control classifier 108 to classify the security event to a security control from a plurality of security controls. Based on the security events classified to security controls, security control assessment system 102 can be configured to assess the control maturity and security framework compliance of the security controls implemented in IT environment 130. In some embodiments, event processor 106 can store the enriched events in security events index database 122.

In some embodiments, security control classifier 108 can be configured to classify security events to security controls based on enriched events corresponding to the security events. In some embodiments, security control classifier 108 can classify a security event to a security control from a plurality of predetermined security controls based on security event type taxonomy 123, as will be further described in FIGS. 7-8. In some embodiments, the assignment of a security event to a security control enables activity and maturity measurement data to be collected for the assigned security control. In some embodiments, security control classifier 108 can be configured to store activity data for a security control to control activity database 124, as will be further described in FIG. 7.

In some embodiments, security control maturity assessor 112 can be configured to assess a control maturity of security controls based on the statistics collected during security control classification and stored in control activity database 124. In some embodiments, security control maturity assessor 112 can quantify the security control maturity based on network segmentation and business impact data associated with various components in IT environment 130 and stored in security operations model 125, as will be further described in FIGS. 9-10. In some embodiments, security control maturity assessor 112 can store the assessment results in security maturity measurement database 127.

Figure 11:
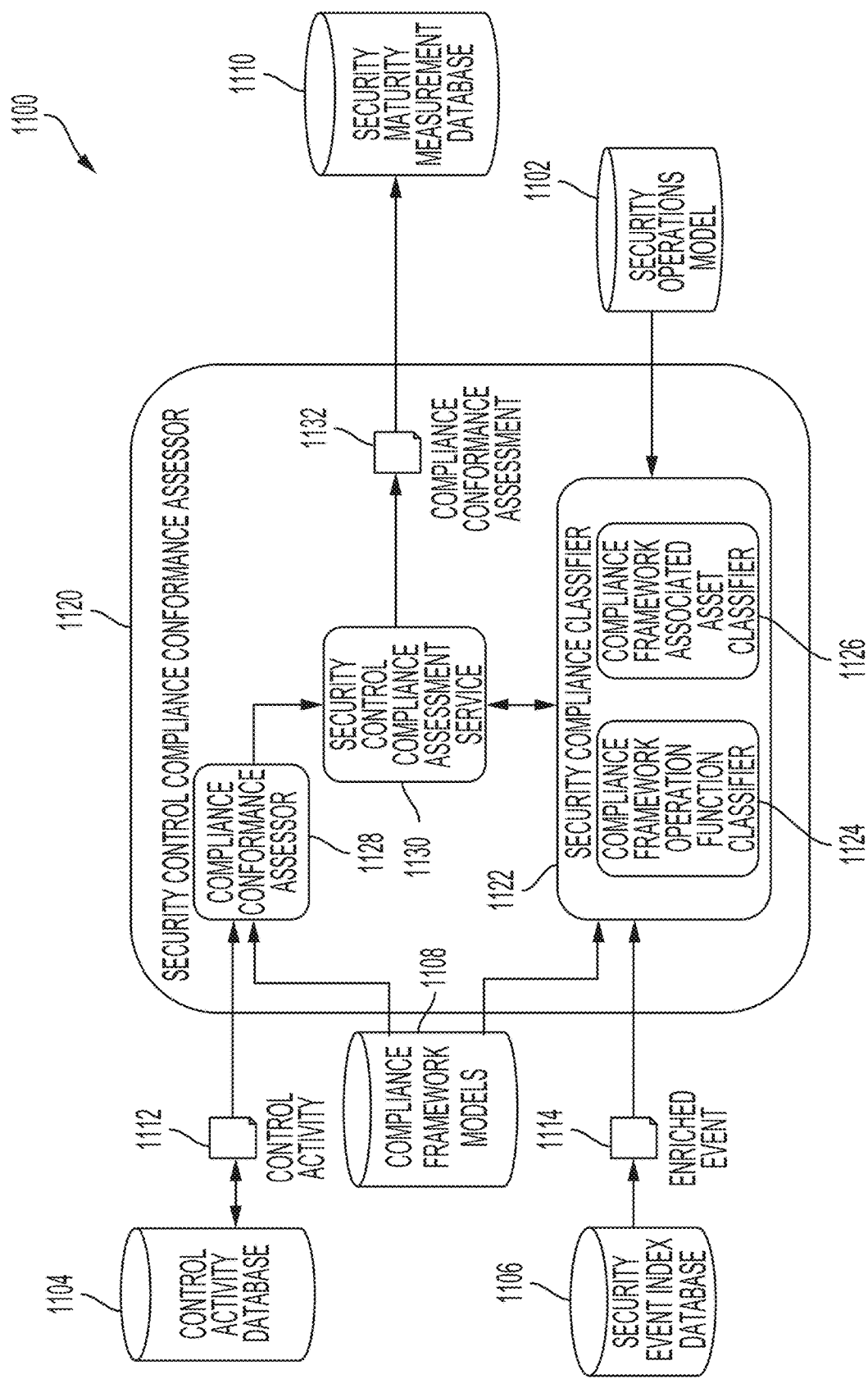
FIG. 11 illustrates a diagram showing components of a security control compliance conformance assessor in the security control assessment system, according to some embodiments.
Figure 12:
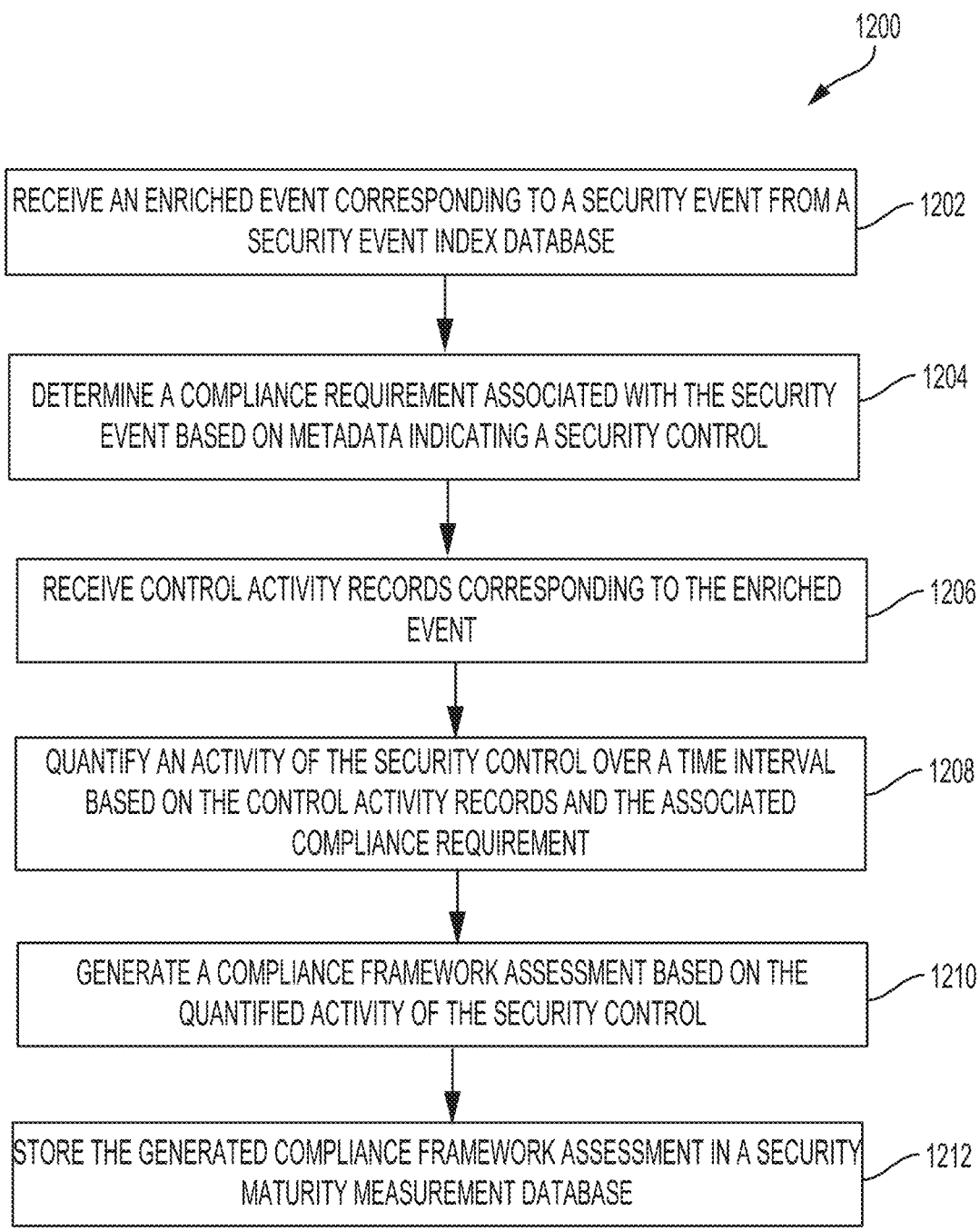
FIG. 12 illustrates a method for assessing a compliance conformance of security controls implemented in an IT environment, according to some embodiments.

In some embodiments, security compliance conformance assessor 110 can be configured to calculate a measure of how well the security controls implemented in IT environment 130 conform to one or more security frameworks stored in security compliance framework model 126, as will be further described in FIGS. 11-12. In some embodiments, security compliance conformance assessor 110 can assess the security controls conformance based on control activity data in control activity database 124 and maturity assessment data stored in security maturity measurement database 127.

Figure 13:
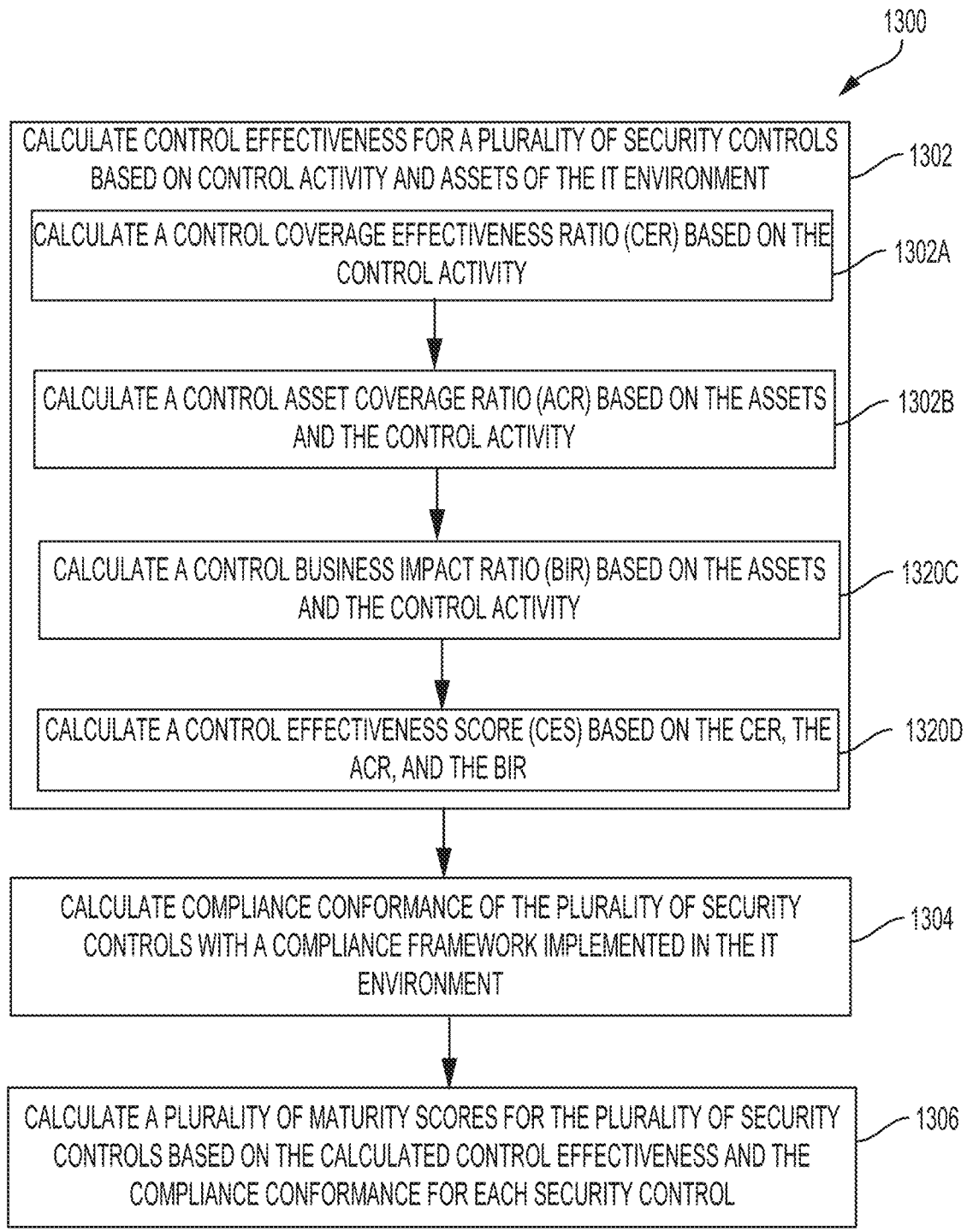
FIG. 13 illustrates a method for providing a maturity assessment of a plurality of security controls implemented in an IT environment, according to some embodiments.

In some embodiments, dashboard system 114 can be initiate actions to correct or remediate control gaps identified in the assessments of control maturity or framework compliance of the security controls implemented in IT environment 130, as will be further described in FIG. 13. In some embodiments, dashboard system 114 includes the following components: security maturity report service 116, security maturity visualization service 118, and security analytics platform. In some embodiments, security maturity report service 116 can be configured to generate security maturity reports to users such as the user of user device 140. In some embodiments, security analytics platform 120 can be configured to generate alerts or security recommendations based on the assessments performed by security compliance conformance assessor 110 or security control maturity assessor 112. In some embodiments, security maturity visualization service 118 can be configured to render a user interface through programmatic and visual interfaces to allow the user (e.g., a user operating user device 140) to view the security maturity reports, alerts, or security recommendations. In some embodiments, to improve the way in which users can assess control maturity, security maturity visualization service 118 can be configured to display a matrix of operational functions crossed with asset classes in which each cell of the matrix corresponds to one or more security controls.

Figure 2:
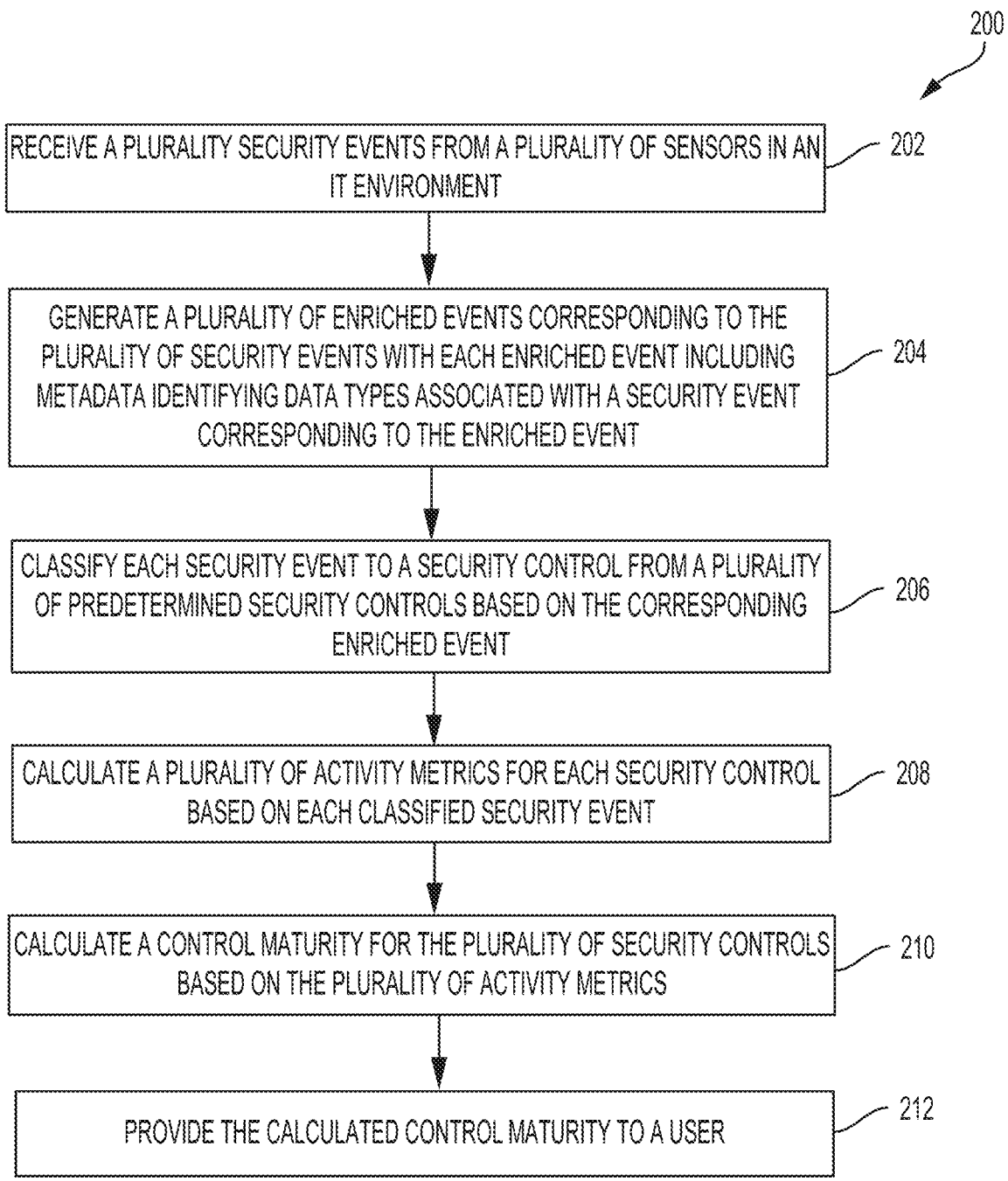
FIG. 2 illustrates a method for assessing security controls implemented in an IT environment, according to some embodiments.

FIG. 2 illustrates a method 200 for assessing security controls implemented in an IT environment (e.g., IT environment 130), according to some embodiments. In some embodiments, the security controls assessment can include a security maturity assessment as well as security recommendations to improve security controls. In some embodiments, method 200 can be performed by a security system such as security control assessment system 102 of FIG. 1. For ease of illustration, one or more of the following steps may be described with respect to the components of security control assessment system 102.

In step 202, the security system (e.g., event processor 106) receives a plurality of security events from a plurality of sensors in an IT environment. In some embodiments, the security event can be received from one or more sensors 136 in IT environment 130. In some embodiments, each sensor can be configured to detect a type of security information in the IT environment.

In step 204, the security system (e.g., event processor 106) generates a plurality of enriched events corresponding to the plurality of security events with each enriched event including metadata identifying data types associated with a security event corresponding to the enriched event. In some embodiments, the security system can be configured to match portions of the security event with a plurality of event patterns to select a matching event pattern. In some embodiments, each enriched event includes metadata identifying data types associated with a plurality of portions of the security event that match the selected event pattern. In some embodiments, each event pattern can include a regular expression with named groups that capture matching portions of a security event. In some embodiments, an enriched event generated for a security event can be stored in a security event index database.

In step 206, the security system classifies each security event to a security control from a plurality of predetermined security controls based on the corresponding enriched event. In some embodiments, the security system can be configured to index the security event index database to select a plurality of enriched events and corresponding security events to process. In some embodiments, the security system can determine an operational function of the security control and an asset protected by the security control based on the security control. For example, the security system may access a security operations model that maps security controls to pairs of operational functions and assets to determine the operational function and the asset associated with the security control. In some embodiments, the security system can generate a model of a security environment corresponding to IT environment 130. This model may be stored as the security operations model (e.g., security operations model 125). In some embodiments, the security system (e.g., system configuration controller 104) can provide a user interface that enables the user to add, revise, or delete one or more of the models stored in security operations model 125.

In step 208, the security system calculates a plurality of activity metrics for each security control based on each classified security event. In some embodiments, the security system can store the plurality of calculated activity metrics as control activity records in a control activity database. In some embodiments, each control activity records corresponds to a security control and includes information indicating one or more of a unique ID, a control type, an event type, a "last update" timestamp, an activity count, or a combination thereof.

In step 210, the security system calculates a control maturity for the plurality of security controls based on the plurality of activity metrics. In some embodiments, calculating the control maturity includes calculating a control maturity score for each security control of the plurality of security controls. In some embodiments, calculating the control maturity includes calculating a control maturity score for each security control of the plurality of security controls for each network domain from a plurality of network domains configured for the IT environment.

In some embodiments, the security system can calculate a control maturity score for a security control by calculating a control effectiveness score (CES) and a compliance conformance score (CCS), as will be further described below with respect to FIG. 13. For example, the control maturity score can be calculated by multiplying the CES with the CCS. The CES measure if the security control in place is performing its job, while the CCS measures if the security control fulfills compliance requirements. In some embodiments, the combination of the CES with the CCS to generate the control maturity score provides a measure of how well compliance is being met with the security controls in place.

In some embodiments, to calculate the CES, the security system can calculate a control coverage effectiveness ratio (CER), a control asset coverage ratio (ACR), and a control business impact ratio (BIR), as will be further described below with respect to FIG. 13. In some embodiments, the security system can calculate the CER based on the plurality of activity metrics and the CER measures the ratio of time where a security control was active over a predefined time period. In some embodiments, the security system can calculate the ACR based on the plurality of activity metrics and a plurality of assets associated with the plurality of security controls corresponding to the plurality of security events. The ACR can measure the hosts (e.g., assets) covered by a security control versus a total number of hosts in a network domain. In some embodiments, the security system can calculate the BIR based on the plurality of activity metrics for the security controls and business impact scores assigned to each asset. The BIR may compute a ratio of the total business impact relative to the maximum possible impact associated with the assets covered by the security control.

In step 212, the security system provides the calculated control maturity to a user. In some embodiments, the user may be a network administrator or an IT administrator of the IT environment or a third-party responsible for auditing the security controls of the IT environment. In some embodiments, a dashboard of the security system can be configured to generate automated reports that include the calculated control maturity. In some embodiments, the dashboard can be configured to provide visualizations of the control maturity via a graphical user interface. In some embodiments, the security system can be configured to initiate security focused analytics to generate alerts and security recommendations based on the assessment of security controls of the IT environment.

Figure 3:
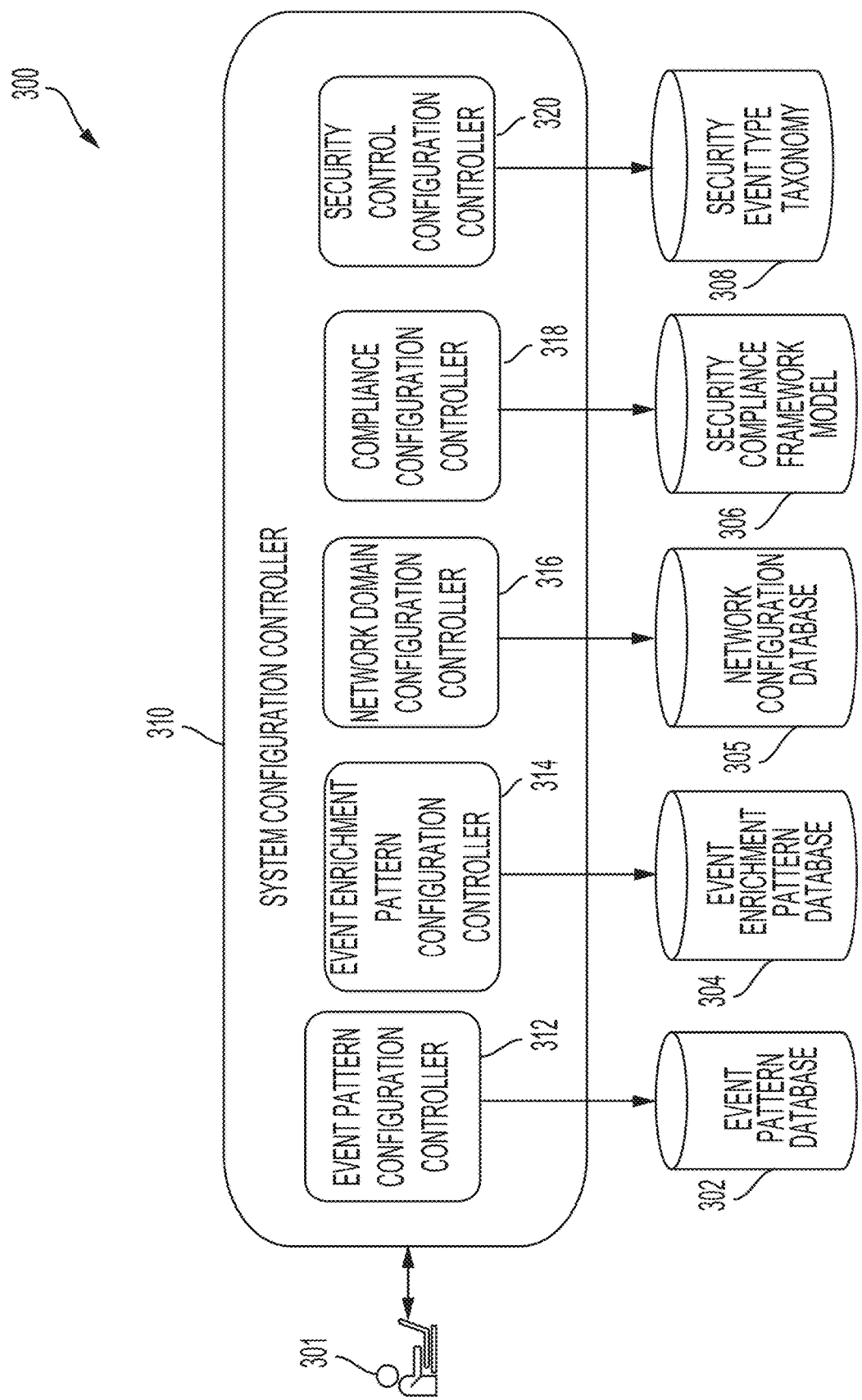
FIG. 3 illustrates a diagram showing components of a system configuration controller in the security control assessment system, according to some embodiments.

FIG. 3 illustrates a diagram 300 showing components of a system configuration controller 310 (e.g., system configuration controller 104) in a security control assessment system (e.g., security control assessment system 102), according to some embodiments. In some embodiments, system configuration controller 310 enables a user 301 to setup and configure one or more system data stores within, e.g., security control assessment system 102. To provide this configuration functionality, system configuration controller 310 can include the following components: event pattern configuration controller 312, event enrichment pattern configuration controller 314, network domain configuration controller 316, compliance configuration controller 318, and security control configuration controller 320.

In some embodiments, event pattern configuration controller 312 can be configured to define event patterns that enable security events to be recognized for further processing by event processor 106 (e.g., an event enrichment processor or an event activity processor) based on user input from user 301. In some embodiments, an event pattern can be configured to define a regular expression pattern with a plurality of named groups that enable event processor 106 to generate enriched events for security events based on matching event patterns. In some embodiments, matching a security event to the event pattern causes a plurality of portions of the security event to be captured in the plurality of corresponding named groups. In some embodiments, a named group can be configured to map the captured portion of the security event to a data type corresponding to the named group. For example, the data type may include a timestamp, an event type, an event severity, sensor vendor details, or sensor type details. In some embodiments, the defined event patterns can be stored in event pattern database 302. In some embodiments, the defined event patterns can be updated after security control assessment system 102 is deployed in live production environments through a content delivery service.

In some embodiments, event enrichment pattern configuration controller 314 can enable user 301 to configure mappings between types of event patterns and specific types of event data. In some embodiments, the user configurations can be stored in event enrichment pattern database 304. For example, an enrichment pattern definition may be added that detects ISO 8601 format timestamps, finds the first one in an event record, and uses that timestamp as the one of record for the event. In some embodiments, the defined enrichment patterns can be stored in event enrichment pattern database 304. In some embodiments, the defined patterns can be updated after security control assessment system 102 is deployed in live production environments through a content delivery service.

In some embodiments, network domain configuration controller 316 configures network domains for IT environment 130 based on user input from user 301. In some embodiments, a network domain configuration can include a network label, a range of addresses (e.g., an IP address range, or CIDR block), a unique identifier, an associated business impact value for that network domain, or a combination thereof. In some embodiments, the defined network domain configuration can be stored in network configuration database 305. In some embodiments, the defined network domain configuration can be updated after security control assessment system 102 is deployed in live production environments through a content delivery service.

In some embodiments, compliance configuration controller 318 configures one or more compliance frameworks stored in security compliance framework model 306 based on user input from user 301. For example, the user input can control compliance configuration controller 318 to add a new compliance framework or to update an existing compliance framework. In some embodiments, compliance configuration controller 318 can define compliance framework configuration mappings to operational functions and asset classes, including standard and custom configurations of which security control requirements apply to a given network domain or the organization as a whole (e.g., entire IT environment 130). In some embodiments, a custom configuration enables special use cases or unique compliance requirements to be addressed by users administering the security control assessment of IT environment 130. For example, a custom configuration may include creating hybrid compliance framework requirements and specifying areas of accepted risk. In some embodiments, the compliance framework configurations can be stored in security compliance framework model 306. In some embodiments, a stored configuration includes mappings between operational functions and asset classes, defining a matrix of cells. In some embodiments, the defined compliance mapping configurations can be updated after security control assessment system 102 is deployed in live production environments through a content delivery service.

In some embodiments, security control configuration controller 320 configures security controls configurations based on user input from user 301. For example, the user input can control security control configuration controller 320 to add a new security control or to update an existing security control. In some embodiments, a security control configuration can include an existing or planned control deployment, whether that security control is active, a mapping to an operational function and an asset class for that security control, or a combination thereof. In some embodiments, a configuration can include which security control requirements apply to a given network domain or the organization as a whole (e.g., entire IT environment 130). In some embodiments, the security control configurations can be stored in security event type taxonomy 308. In some embodiments, the taxonomy defines the type of events that are mapped to in the security compliance framework model 306.

FIG. 4 illustrates a diagram 400 showing components of an event processor 402 (e.g., event processor 106) in a security control assessment system (e.g., security control assessment system 102), according to some embodiments. In some embodiments, event processor 402 can be configured to generate an enriched security event based on a received security event to enable security control classifier 108 to classify security events to security controls. As will be described below, this classification can allow security control assessment system 102 to assess the security control maturity of an observed IT environment 130, according to some embodiments. In some embodiments, event processor 402 includes the following components: event manager 404, event parser 406, and event enrichment processor 408.

In some embodiments, event manager 404 can be configure to manage the inflow of security event 401 to ensure that security event 401 is processed at an appropriate time interval. In some embodiments, security event 401 can be received from security control data sources such as sensors 136. In some embodiments, event manager 404 can store a received security event 401 in security event index database 420. In some embodiments, event manager 404 can be configured to index security event index database 420 to select one or more security events to be enriched with metadata. In some embodiment, event manager 404 can operate on a regularly schedule interval (e.g., every hour, every 30 minutes, every 5 minutes, etc.). In some embodiments, event manager 404 can be configured to receive an enriched event 410 corresponding to security event 401 from event enrichment processor 408 and store enriched event 410 in security event index database 420.

In some embodiments, event parser 406 can be configured to receive a record from event manager 404 and corresponding to security event 401. In some embodiments, event parser 406 can be configured to determine an event type of the record based on the plurality of event patterns stored in event pattern database 412 and corresponding to a plurality of respective event types. In some embodiments, to determine the event type of security event 401, event parser 406 can match a plurality of portions of the record corresponding to security event 401 to the plurality of event patterns to select a matching event pattern. In some embodiments, the selected event pattern indicates the event type. In some embodiments, event parser 406 selects the event pattern that best matches the record of security event 401.

In some embodiments, an event pattern includes a regular expression with a plurality of named groups. In these embodiments, upon matching security event 401 to the selected event pattern, event parser 406 can output a parsed event including a plurality of captured groups of text from the record and corresponding to the plurality of corresponding named groups of the selected event pattern. In some embodiments, the captured groups can include categories of information that enable metadata to be generated for security event 401 and to map security event 401 to a common information model. Examples of captured groups may include network device IDs (e.g., MAC address, IP address, and asset serial number), security control device IDs, event severity information, vendor identification information, event type, etc. These event categories are based on a set of patterns defined to map to a common information model, according to some embodiments.

In some embodiments, event enrichment processor 408 takes a parsed event as input (e.g., including named groups of text corresponding to a selected event pattern) and applies a set of enrichment patterns from event enrichment pattern database 412 to generate enriched event 410 corresponding to security event 401. In some embodiments, enriched event 410 includes the plurality of named groups of text annotated with a data type and a normalized format. In some embodiments, event enrichment processor 408 can be configured to select and apply a plurality of enrichment patterns to the plurality of portions of security event 401 captured in the parsed event. In some embodiments, event enrichment processor 408 can be configured to select an enrichment pattern for a named group of captured text based on the event category mapped to the named group.

In some embodiments, an enrichment pattern can include general event data identifier 430A, timestamp identifier 430B, event severity data identifier 430C, sensor type data identifier 430D, control vendor identifier 430E (e.g., make, model, and security event type), control event type data identifier 430F, or network device identifier 430G (e.g., IP addresses, MAC addresses, and host names). Accordingly, event enrichment processor 408 can identify the plurality of captured named groups of the parsed event based on the set of matching enrichment patterns. In some embodiments, applying an enrichment pattern to a named group can include adding metadata that describes a type or a normalized format for the named group, as will be further described in FIG. 5.

In some embodiments, the event enrichment process can include using stored configuration and knowledgebase data. For example, network device identifier 430G can be identified from one or more named groups of a parsed event based on network configuration database 418. In some embodiments, network configuration database 418 can be configured to store a configuration of network domains (e.g., IP ranges, CIDR blocks, single hosts) with associated metadata such as network labels, domains (fully qualified domains or Windows domains), and business impact ranking. In another example, sensor type data identifier 430D can be identified from one or more named groups of a parsed event based on security event type taxonomy 416. In some embodiments, security event type taxonomy 416 can be configured to store the types of data that are produced from sensors 136 in a security context, such as malware detections and firewall actions.

In some embodiments, event enrichment processor 408 can be configured to transmit enriched event 410 generated from security event 401 to event manager 404. As described above, upon receiving enriched event 410, event manager 404 can be configured to store enriched event 410 as a record in security event index database 420. Therefore, the record that stores enriched event 410 may store relevant security metadata associated with security event 401. As described above, the security metadata may be any data pertinent to event assessment and security control activity calculations, as will be further described below with respect to FIGS. 7-8. For example, the security metadata may include internet protocol (IP) addresses, business value of assets, identification of installed software applications, or identification of applicable security vulnerabilities.

FIG. 5 illustrates a diagram 500 showing example metadata generated for a security event 502, according to some embodiments. In some embodiments, the security event 502 corresponds to the record for security event 401 and the metadata can be generated by event enrichment processor 408 of FIG. 4. As shown in diagram 500, event parser 406 can be configured to parse security event 502 to select a matching event pattern from event pattern database 412. In some embodiments, the parsed event generates a plurality of captured portions 520A-G corresponding to the plurality of named groups in the selected event pattern. In some embodiments, each of portions 520A-G of security event 502 may include text (e.g., strings) that may be related to a vendor sensor make or type, among other types of data. In some embodiments, event enrichment processor 408 can be configured to apply a plurality of enrichment patterns, network configuration data, or security event data to captured portions 520A-G to identify the portions that relate to a plurality of areas of interest so that security control classifier 108 of FIG. 1 can classify security event 502 to a security control from a plurality of security controls.

For example, as shown in diagram 500, event enrichment processor 408 can generate metadata corresponding to event data 506, sensor data 510, severity data 514, and network data 516 based on one or more of captured portions 520A-G. In some embodiments, event enrichment processor 408 can perform customer lookup 504 to generate metadata (e.g., customerID or providerID) in event data 506. In some embodiments, event enrichment processor 408 can perform sensor lookup 508 by querying security event type taxonomy 416 to generate metadata (e.g., sensor name, sensor type, sensor IP, or sensor log) of sensor data 510. In some embodiments, event enrichment processor 408 can perform severity normalization 512 based on an enrichment pattern selected from event enrichment pattern database 414 to generate severity metadata. In some embodiments, event enrichment processor 408 can perform network lookup 518 by querying network configuration database 418 to generate metadata (e.g., domain name, classification, or network CIDR) of network data 516.

FIG. 6 illustrates a method 600 for generating an enriched event based on a security event, according to some embodiments. In some embodiments, method 600 can be performed by an event processor such as event processor 402 of FIG. 2. For ease of illustration, one or more of the following steps may be described with respect to the components of event processor 402. In some embodiments, method 600 can be performed on a scheduled interval, e.g., every hour, every fifteen minutes, every five minutes, etc. For example, an automated schedule can be configured to set the scheduled interval.

In step 602, the event processor (e.g., event manager 404) receives a security event from a sensor (e.g., sensors 136 of FIG. 1). In some embodiments, the event processor queues the received security event in security event index database 420 to be batch processed at a later time. For example, the event processor may index security event index database 420 to select a plurality of security events to be processed at a regular interval.

In step 604, the event processor (e.g., event parser 406) parses the security event to match a plurality of portions of the security event to an event pattern from a plurality of predetermined event patterns. For example, the plurality of event patterns may be retrieved from event pattern database 412. In some embodiments, matching the security event to the event pattern can include matching and mapping the plurality of portions to a plurality of named groups in a regular expression defined by the event pattern. In some embodiments, a parsed security event can include a plurality of captured portions of text corresponding to the plurality of named groups of the selected event pattern.

In step 606, the event processor (e.g., event enrichment processor 408) generates an enriched event including metadata corresponding to the plurality of portions associated with the matched event pattern. In some embodiments, the metadata includes information in a normalized format that identifies a type of data of a captured portion of the security event. For example, the metadata may include information identifying a network ID, a timestamp, sensor vendor data (e.g., make or model), sensor event type data, event severity data, or a combination thereof as described above with respect to FIGS. 4-5. In some embodiments, the generated enriched event corresponds to the received security event.

In step 608, the events processor (e.g., event manager 404) stores the generated enriched event in security event index database 420. In some embodiments, the stored enriched event can be queried by security control classifier 108 to classify the security event to a security control from a plurality of predetermined security controls, as will be further described in FIGS. 7-8.

Figure 7:
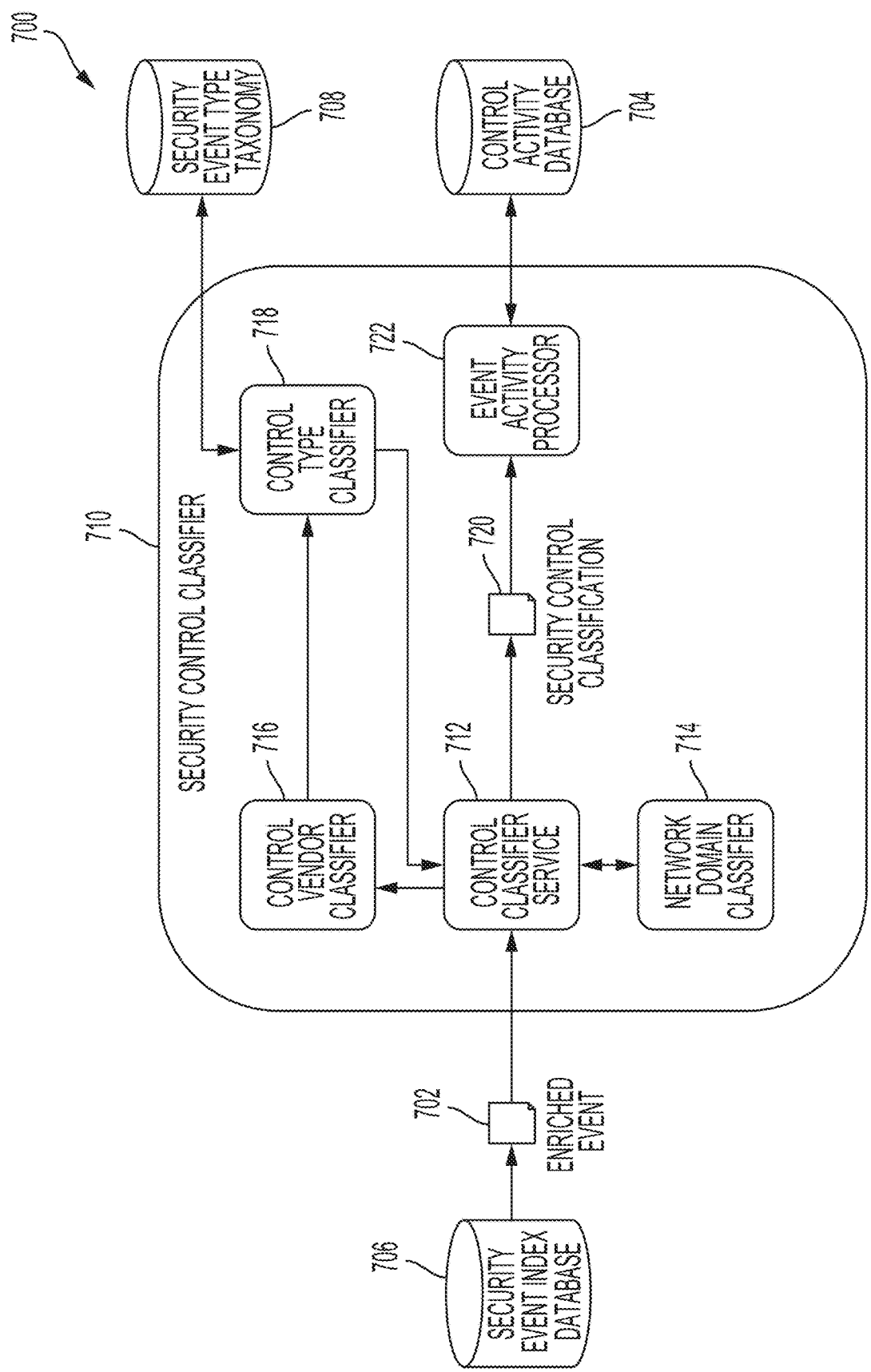
FIG. 7 illustrates a diagram showing components of a security control classifier in the security control assessment system, according to some embodiments.

FIG. 7 illustrates a diagram 700 showing components of a security control classifier 710 (e.g., security control classifier 108) in a security control assessment system (e.g., security control assessment system 102), according to some embodiments. In some embodiments, security control classifier 710 classifies a security event to a security control from a plurality of predetermined security controls such that the selected security control is determined to be most likely associated with the security event. In some embodiments, upon selecting the security control for the security event, security control classifier 710 can be configured to generate activity and maturity measurement data for that security control. In some embodiments, security control classifier 710 includes the following components: control classifier service 712, network domain classifier 714, control vendor classifier 716, control type classifier 718, and event activity processor 722.

In some embodiments, control classifier service 712 receives an enriched event 702 from security event index database 706 (e.g., security event index database 420). In some embodiments, enriched event 702 corresponds to a security event, as described above with respect to FIGS. 4-6. In some embodiments, control classifier service 712 can be configured to retrieve enriched event 702 on a regular interval (e.g., every hour, every fifteen minutes, every five minutes, etc.). In some embodiments, control classifier service 712 controls execution of control vendor classifier 716 and network domain classifier 714 to determine vendor information and network information, respectively. In some embodiments, based on the results from control vendor classifier 716 and network domain classifier 714, control classifier service 712 can be configured to generate a security control classification 720 for enriched event 702 and corresponding security event. In some embodiments, control classifier service 712 can transmit security control classification 720 and corresponding enriched event 702 to event activity processor 722.

In some embodiments, network domain classifier 714 can be configured to receive enriched event 702 and determine whether the security event belongs to a configured network domain based on metadata associated with network identifies generated in enriched event 702. For example, network domain classifier 714 may query network configuration database 305 to classify the security event to a network domain from a plurality of preconfigured network domains stored in network configuration database 305. In some embodiments, network domain classifier 714 transmits the determined network domain for enriched event 702 back to control classifier service 712. In some embodiments, the association between the network domain and a control classification enables more granular computations of the security control and compliance maturity measurements, as will be further described in FIGS. 9-12.

In some embodiments, control vendor classifier 716 can be configured to receive enriched event 702 and determine a vendor classification associated with enriched event 702 based on metadata stored in enriched event 702. In some embodiments, the vendor classification is based on vendor make and model metadata (e.g., associated with event data 506 or sensor data 510) extracted during the event enrichment process, as performed by event processor 106 of FIG. 1. In some embodiments, control vendor classifier 716 can transmit the generated vendor classification to control type classifier 718.

In some embodiments, control type classifier 718 can be configured to receive enriched event 702 including the vendor classification determined by control vendor classifier 716. In some embodiments, control type classifier 718 can be configured to classify enriched event 702 to a security control from a plurality of security controls based on the metadata generated for the security event (e.g., the vendor classification). In some embodiments, control type classifier 718 can be configured to query security event type taxonomy 708 based on the vendor classification information to determine the security control for enriched event 702. In some embodiments, control type classifier 718 transmits the determined security control back to control classifier service 712.

In some embodiments, event activity processor 722 can be configured to receive enriched event 702 including security control classification 720 and generate an activity record for storage in control activity database 704. In some embodiments, security control classification 720 can include enriched event 702, vendor metadata (e.g., a vendor classification generated by control vendor classifier 716), and security control (e.g., a normalized control type classification generated by control type classifier 718). Accordingly, security event activity for a security control corresponding to security control classification 720 can be tracked. In some embodiments, each activity record includes a unique ID, a control type, an event type, a "last update" timestamp, and an activity count. In some embodiments, event activity processor 722 can be configured to create a new record based on a schedule interval (e.g., every hour, every minute, every day, etc.). In some embodiments, the activity records can be accessed and analyzed by a control activity assessor of security control maturity assessor 128 to assess the availability and maturity of security controls, as will be described below in FIGS. 9-10.

Figure 8:
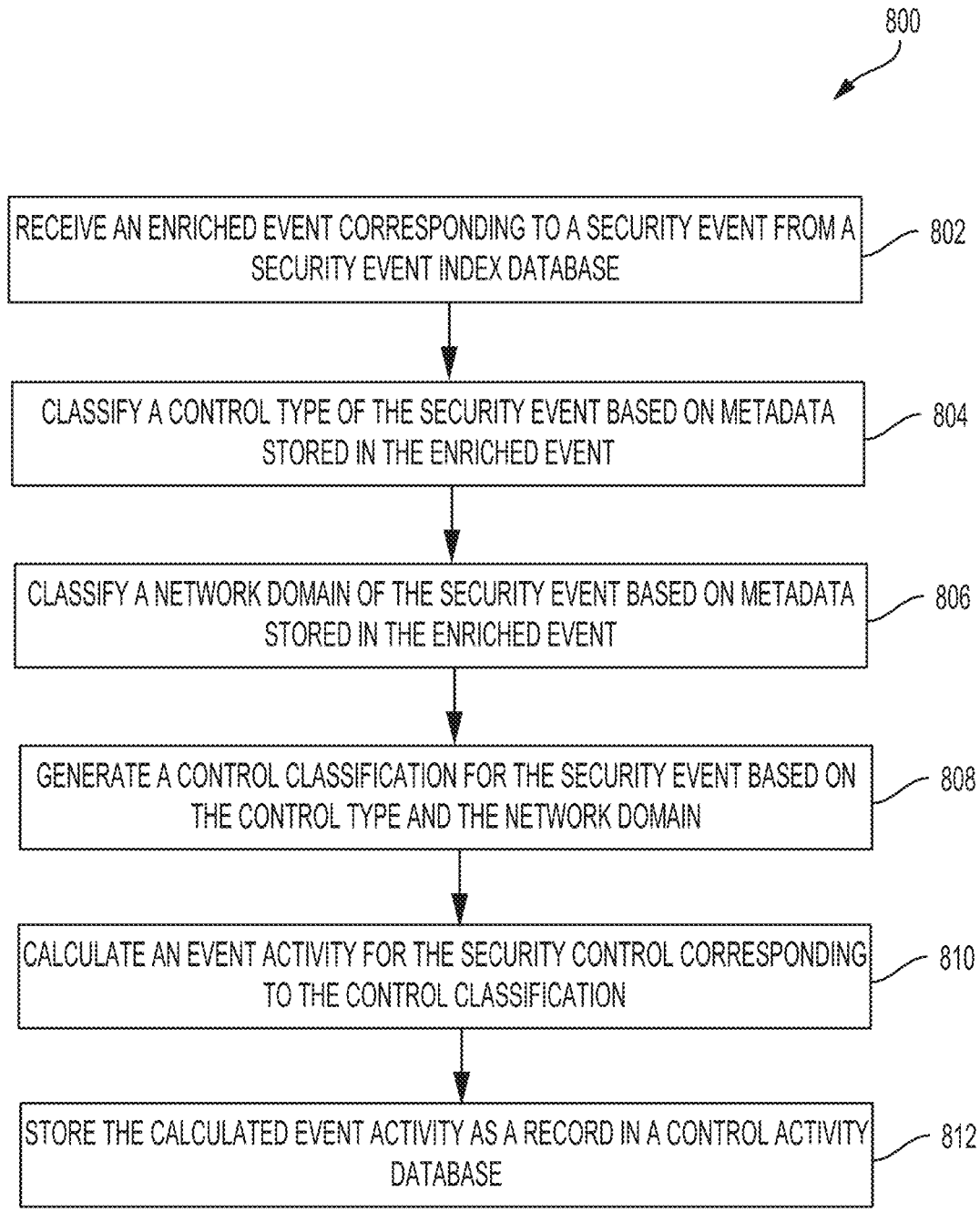
FIG. 8 illustrates a method for classifying a security event to a security control from a plurality of security controls, according to some embodiments.

FIG. 8 illustrates a method 800 for classifying a security event to a security control from a plurality of security controls, according to some embodiments. In some embodiments, method 800 can be performed by a security control classifier such as security control classifier 710 of FIG. 7. For ease of illustration, one or more of the following steps may be described with respect to the components of security control classifier 710. In some embodiments, method 800 can be performed on a scheduled interval, e.g., every hour, every fifteen minutes, every five minutes, etc. For example, an automated schedule can be configured to set the scheduled interval.

In step 802, the security control classifier (e.g., control classifier service 712) receives an enriched event corresponding to a security event from security event index database 706. In some embodiments, the security control classifier can be configured to retrieve enriched events from security event index database 706 based on the scheduled interval. In some embodiments, the security control classifier can be configured to request control vendor classifier 716 and network domain classifier 714 to generate control type and network domain information, respectively, for the security event, as described above in FIG. 7.

In step 804, the security control classifier (e.g., control type classifier 718) classifies a control type of the security event based on metadata stored in the enriched event. In some embodiments, the security control classifier (e.g., control vendor classifier 716) classifies the enriched event to a control vendor from a plurality of control vendors based on metadata associated with sensor data or event data. Then, the security control classifier (e.g., control type classifier 718) may determine the control type by querying security event type taxonomy 708 based on the classified control vendor.

In step 806, the security control classifier (e.g., network domain classifier 714) classifies a network domain of the security event based on metadata stored in the enriched event. In some embodiments, the security control classifier (e.g., network domain classifier 714) can query a network configuration database 305 for the network domain based on metadata associated with network data to determine the network domain.

In step 808, the security control classifier (e.g., control classifier service 712) generates a control classification 720 for the security event based on the control type and the network domain. Accordingly, the security control classifier can be configured to match each security event to a security control from a plurality of predetermined security controls.

In step 810, the security control classifier (e.g., event activity processor 722) calculates an event activity for the security control corresponding to the control classification. In some embodiments, the security control classifier can track an activity count for the security control associated with the network domain identified in step 806. Accordingly, the security control classifier can track event activity for a plurality of security controls for each network domain in a plurality of network domains.

In step 812, the security control classifier stores the calculated event activity as a record in control activity database 704. In some embodiments, the record can correspond to the security event and includes a "last update" timestamp and an activity count, as described above in FIG. 6.

Figure 9:
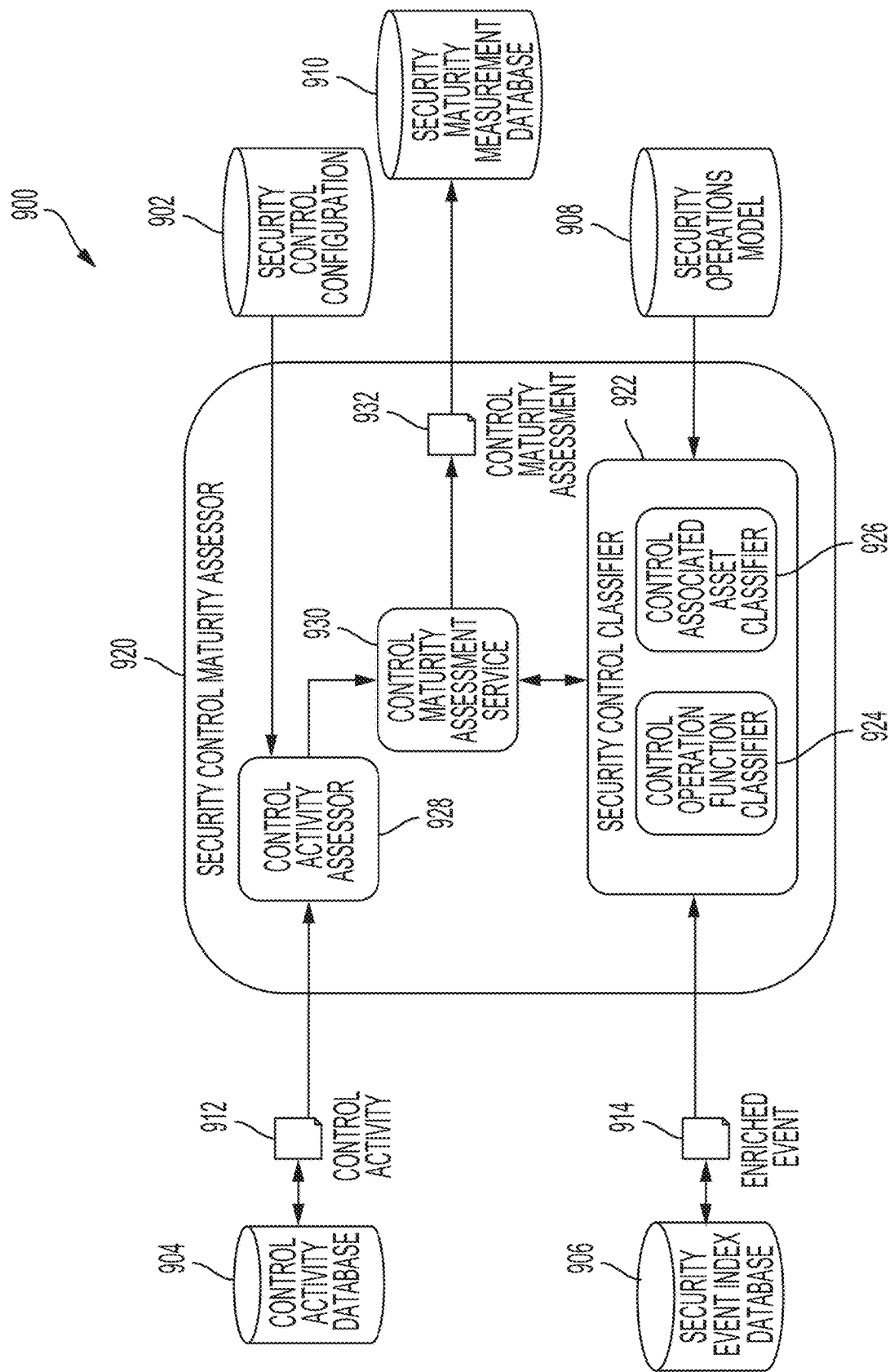
FIG. 9 illustrates a diagram showing components of a security control maturity assessor in the security control assessment system, according to some embodiments.

FIG. 9 illustrates a diagram 900 showing components of a security control maturity assessor 920 (e.g., security control maturity assessor 128) in a security control assessment system (e.g., security control assessment system 102), according to some embodiments. In some embodiments, security control maturity assessor 920 can be configured to analyze event activity for security controls, as collected by security control classifier 108, to quantify a security controls maturity of IT environment 130 based on network segmentation and business impact. To quantify the security controls maturity, security control maturity assessor 920 can include the following components: security control classifier 922, control activity assessor 928, and control maturity assessment service 930.

In some embodiments, control activity assessor 928 can be configured to receive control activity 912 and corresponding security events from control activity database 904 (e.g., control activity database 124). In some embodiments, control activity assessor 928 can be configured to generate statistics for security controls based on received control activity 912. In some embodiments, the statistics can include an activity count per sensor type or per security control defined in security control configuration 902. In some embodiments, security control configuration 902 can include user-configured configurations that indicate which security controls are active, mappings from a security control to a pair of operational function and asset class, and security control requirements that apply to one or more selected network domains of IT environment 130. In some embodiments, the statistics can be calculated for each active security control for each network domain configured in security control configuration 902. In some embodiments, control activity assessor 928 can transmit the generated activity statistics to control maturity assessment service 930.

In some embodiments, security control classifier 922 can be configured to classify security events and corresponding security controls to associated operational functions and associated asset classes. In some embodiments, enriched event 914 corresponding to a security event can be received from a security event index database 906. For example, enriched event 914 may have been previously generated by event processor 106 or security control classifier 108. In some embodiments, control operation function classifier 924 can be configured to determine an operational function fulfilled by the security control assigned to enriched event 914 based on metadata (e.g., security control classification) stored in enriched event 914. In some embodiments, control associated asset classifier 926 can be configured to determine an asset class associated with enriched event 914 based on metadata (e.g., control classification) stored in enriched event 914. As will be further described below with respect to FIGS. 14-16, the mapping between security controls to corresponding pairs of operational function and asset classes may enable the security control assessment system to generate a visualization (e.g., a grid of operational assets crossed with asset classes) to aid users to quickly assessing security control maturity.

In some embodiments, security control classifier 922 can be configured to determine the operational function and the asset class for enriched event 914 based on security operations model 908. In some embodiments, security operations model 908 includes object classes and relationships for a security operations environment defined for IT environment 130. In some embodiments, security operations model 908 can include a set of security controls (e.g., example object classes) and their associations with operational functions (e.g., example object classes) and asset classes (e.g., example object classes). Example object classes may include the types of controls in place, types of events that occur, operational functions and related actions, classes of assets under security management, types of resources used to perform security operations tasks, etc. Example relationships may include linking asset classes to operational functions or security controls to asset classes to operational functions. In some embodiments, security operations model 908 includes mappings between security controls and a corresponding pair of an operational function and an asset class. In these embodiments, control operation function classifier 924 can determine an operational function for enriched event 914 by querying security operations model 908 for the security control. Similarly, control associated asset classifier 926 can determine an asset class associated with enriched event 914 by querying security operations model 908 for the security control.

In some embodiments, control maturity assessment service 930 can be configured to control the execution of control activity assessor 928 and security control classifier 922 to generate a control maturity assessment 932 for storage in security maturity measurement database 910. In some embodiments, security maturity measurement database 910 includes a repository for control maturity assessment data.

In some embodiments, control maturity assessment service 930 can generate a request to cause control activity assessor 928 to retrieve a set of control activity records 912 corresponding to security controls. In some embodiments, upon receiving the security control classification and control activity measurement from security control classifier 922 and control activity assessor 928, respectively, control maturity assessment service 930 can be configured to calculate control maturity assessment 932, as will be further described below in FIGS. 10 and 13. In some embodiments, calculating control maturity assessment 932 includes scoring each network domain defined for IT environment 130 against the claimed versus observed set of security controls as well as the activity and effectiveness tracked for those security controls. In some embodiments, each generated score can represent the relative maturity of security controls in place for a network segment, over a time period for assessment, and under assessment. In some embodiments, the network segment can represent a plurality of network segments corresponding to the configured network domains.

Figure 10:
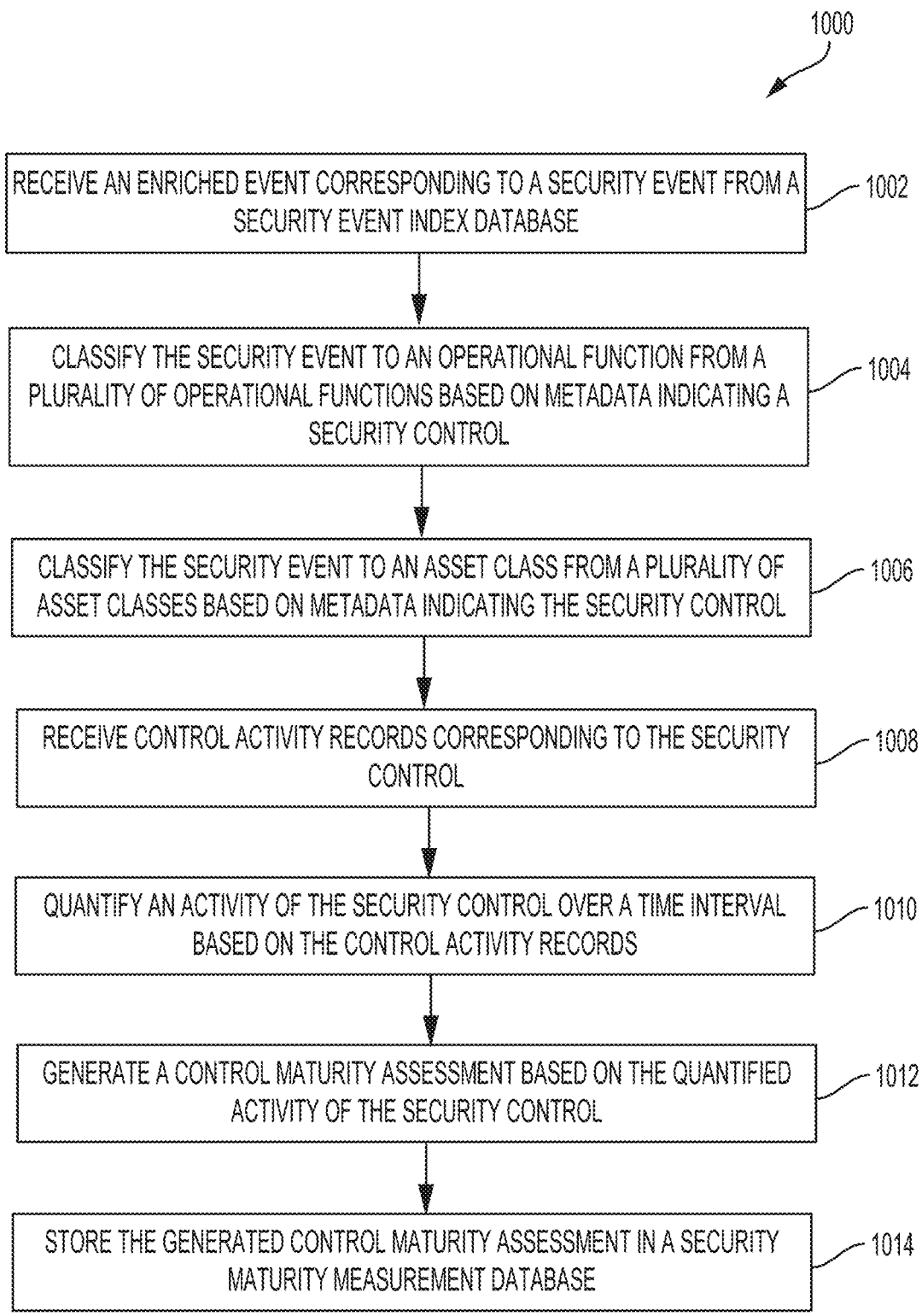
FIG. 10 illustrates a method for assessing a control maturity of security controls implemented in an IT environment, according to some embodiments.

FIG. 10 illustrates a method 1000 for assessing a control maturity of security controls implemented in IT environment 130, according to some embodiments. In some embodiments, method 1000 can be performed by a control maturity assessor such as security control maturity assessor 920 of FIG. 9. For ease of illustration, one or more of the following steps may be described with respect to the components of security control maturity assessor 920.

In step 1002, the control maturity assessor (e.g., security control classifier 922) receives an enriched event corresponding to a security event from security event index database 906. In some embodiments, the control maturity assessor can be configured to retrieve enriched events from security event index database 906 based on a scheduled interval. As described above in FIGS. 1 and 4-7, the enriched event can include metadata describing various portions of the security event and including, for example, a security control determined to be associated with the security event.

In step 1004, the control maturity assessor (e.g., control operation function classifier 924) classifies the security event to an operational function from a plurality of operational functions based on metadata indicating a security control. In some embodiments, the control maturity assessor can determine the operational function of the security control based on a control matrix stored in security operations model 908. In some embodiments, the control matrix includes a plurality of mappings between security controls and corresponding operational functions. In some embodiments, the operational function determined for the security event can be transmitted to a control maturity assessment service (e.g., control maturity assessment service 930). In some embodiments, the control maturity assessor can be configured to determine whether the security controls implemented in the IT environment comply with compliance framework requirements based on the operational function determined to be provided by the security control, as will be further described below with respect to FIGS. 12-13.

In step 1006, the control maturity assessor (e.g., control associated asset classifier 926) classifies the security event to an asset class from a plurality of asset classes based on the metadata indicating the security control. In some embodiments, the control maturity assessor can determine the asset class (e.g., data or devices) protected by the security control based on a control matrix stored in security operations model 908. In some embodiments, the control matrix includes a plurality of mappings between security controls and corresponding asset classes. In some embodiments, the control matrix maps a plurality of security controls to a plurality of pairs of operational functions and asset classes. In some embodiments, the asset class determined for the security event can be transmitted to a control maturity assessment service (e.g., control maturity assessment service 930).

In step 1008, the control maturity assessor (e.g., control activity assessor 928) receives control activity records corresponding to the security control. In some embodiments, the control maturity assessor retrieves the control activity records from control activity database 904. In some embodiments, the control maturity assessor can be configured to retrieve control activity records corresponding to a plurality of security controls.

In step 1010, the control maturity assessor (e.g., control maturity assessment service 930) quantifies an activity of the security control over a time interval based on the control activity records. For example, the control maturity assessor may calculate a control coverage effectiveness ratio (CER), which measures the ratio of time that the security control is detected as active, as will be further described in FIG. 13. In some embodiments, the control maturity assessor can be configured to calculate the CER for each security control from a plurality of security controls.

In step 1012, the control maturity assessor (e.g., control maturity assessment service 930) generates a control maturity assessment (e.g., control maturity assessment 932) based on the quantified activity for the security control. In some embodiments, the control maturity assessment includes calculating a plurality of control effectiveness scores (CES) measuring the effectiveness of the security control over time across a plurality of corresponding network domains (d). In some embodiments, the CES can be calculated based on the CER, a control asset coverage ratio (ACR), and a control business impact ratio (BIR) (e.g., CES(d)=(CER*ACR)−((1−ACR)*BIR), as will be further described below in FIG. 13.

In some embodiments, the control maturity assessor can calculate a control maturity for the security control based on the control effective scores (CES) and a compliance conformance score (CCS) (e.g., control maturity=CES*CCS), as will be further described below in FIGS. 11-13. In some embodiments, the compliance conformance score (CCS) can be calculated by security compliance conformance assessor 110 of FIG. 1 based on whether the implemented security controls comply with conformance framework requirements. In some embodiments, security compliance conformance assessor 110 can determine whether a conformance framework requirement is satisfied based on the operational functions classifications for the security controls, as described in step 1004. In some embodiments, the control maturity assessor can be configured to calculate a maturity of the plurality of security controls implemented in IT environment 130 according to the above processes.

In step 1014, the control maturity assessor (e.g., control maturity assessment service 930) stores the generated control maturity assessment in security maturity measurement database 910.

FIG. 11 illustrates a diagram 1100 showing components of a security control compliance conformance assessor 1120 (e.g., security compliance conformance assessor 110) in a security control assessment system (e.g., security control assessment system 102), according to some embodiments. In some embodiments, security control compliance conformance assessor 1120 can be configured to analyze security control activity and control maturity assessment, as determined by security control maturity assessor 920, to calculate a measure of how well an organization conforms to one or more security frameworks. To quantify the security control compliance conformance, security control compliance conformance assessor 1120 can include the following components: security compliance classifier 1122, compliance conformance assessor 1128, and security control compliance assessment service 1130.

In some embodiments, compliance conformance assessor 1128 receives control activity 1112 and corresponding security events from control activity database 1104 (e.g., control activity database 124). In some embodiments, compliance conformance assessor 1128 can be configured to quantify a conformance to a plurality of compliance requirements defined in security compliance framework models 1108 based on the control activity.

In some embodiments, security compliance classifier 1122 can be configured to classify security events and corresponding security controls to associated operational functions, associated asset classes, and associated compliance framework requirements stored in security compliance framework model 1108. In some embodiments, enriched event 1114 corresponding to a security event can be received from a security event index database 1106. For example, enriched event 1114 may have been previously generated by event processor 106 or security control classifier 108. In some embodiments, security compliance classifier 1122 can be configured to determine the operational function and the asset class for enriched event 1114 based on security operations model 1102, as described above with respect to security control classifier 922 of FIG. 9.

In some embodiments, compliance framework operation function classifier 1124 can be configured to determine which compliance framework requirement is fulfilled by an operational function associated with enriched event 1114 based on metadata (e.g., control classification) stored in enriched event 1114 and based on security compliance framework model 1108. In some embodiments, compliance framework operation function classifier 1124 can determine the operations function based on the security control assigned to enriched event 1114 and security operation model 1102 configured to store mappings between security controls and operational functions.

In some embodiments, compliance framework associated asset classifier 1126 can be configured to determine an asset class associated with enriched event 1114 based on the context of the compliance framework stored in security compliance framework models 1108. In some embodiments, these outputs can be used by control maturity assessment service 930 to calculate a compliance conformance score for the security control. In some embodiments, security compliance framework models 1108 includes compliance models that enable each security controls to be mapped to one or more compliance requirements. Examples include the Center for Information Security (CIS) Top 20, NIST 800-53, NIST 800-171, FFIEC, and GDPR security compliance frameworks.

In some embodiments, security control compliance assessment service 1130 can generate a request to cause compliance conformance assessor 1128 to retrieve a set of control activity records 1112 corresponding to enriched events 1114 from security event index database 1106. In some embodiments, upon receiving the security control and compliance requirement classifications and control activity measurement from security compliance classifier 1122 and compliance conformance assessor 1128, respectively, security control compliance conformance assessment service 1130 can be configured to calculate compliance conformance assessment 1132, as will be further described below in FIGS. 12-13.

In some embodiments, calculating compliance conformance assessment 1132 includes scoring each network domain defined for IT environment 130 against the claimed versus observed set of compliance requirements fulfilled as well as the activity and effectiveness tracked for those requirements.

FIG. 12 illustrates a method 1200 for assessing a compliance conformance of security controls implemented in IT environment 130, according to some embodiments. In some embodiments, method 1200 can be performed by a compliance conformance assessor such as security control compliance conformance assessor 1120 of FIG. 11. For ease of illustration, one or more of the following steps may be described with respect to the components of security control compliance conformance assessor 1120 of FIG. 11.

In step 1202, the compliance conformance assessor (e.g., security compliance classifier 1122) receives an enriched event corresponding to a security event from security event index database 1106. In some embodiments, the compliance conformance assessor can be configured to retrieve enriched events from security event index database 1106 based on a scheduled interval. As described above in FIGS. 1 and 4-7, the enriched event can include metadata describing various portions of the security event and including, for example, a security control determined to be associated with the security event.

In step 1204, the compliance conformance assessor (e.g., security compliance classifier 1122) determines a compliance requirements associated with the security event based on metadata indicating a security control. In some embodiments, the compliance conformance assessor determines a plurality of compliance requirements associated with the security event. In some embodiments, the compliance conformance assessor can look up security operations model 1102 that maps security controls to one or more compliance requirements. In some embodiments, a mapping between a security control and a compliance requirement indicates that the security control fulfills the compliance requirement. In some embodiments, the compliance conformance assessor can retrieve the security compliance frameworks from security compliance framework models 1108. In some embodiments, to determine the associated compliance requirements, the compliance conformance assessor can classify one or more compliance requirements associated with the security control for each framework of the security compliance frameworks.

In step 1206, the compliance conformance assessor (e.g., compliance conformance assessor 1128) receives control activity records corresponding to the security control. In some embodiments, the compliance conformance assessor retrieves the control activity records from control activity database 1104. In some embodiments, the compliance conformance assessor can be configured to retrieve control activity records corresponding to a plurality of security controls.

In step 1208, the compliance conformance assessor (e.g., compliance conformance assessor 1128) quantifies an activity of the security control over a time interval based on the control activity records and the associated compliance requirement. For example, the compliance conformance assessor may calculate a control coverage effectiveness ratio (CER) with respect to the associated compliance requirement. In some embodiments, the compliance conformance assessor can be configured to calculate the CER for each security control from a plurality of security controls. In some embodiments, the compliance conformance assessor can transmit the control activity assessment to security control compliance assessment service 1130.

In step 1210, the compliance conformance assessor (security control compliance assessment service 1130) generates a compliance framework assessment based on the quantified activity of the security control. In some embodiments, the compliance framework assessment includes a score generated based on compliance fulfillment metrics. In some embodiments, the compliance conformance assessor calculates a compliance conformance per compliance framework for each domain configured for IT environment 130. In some embodiments, the compliance conformance can include a first score that is an unweighted score (i.e., raw score) or a second score weighted by points assigned to the value of each compliance framework based on their importance specified in the compliance standard, as will be further described in FIG. 13.

In step 1212, the compliance conformance assessor (security control compliance assessment service 1130) stores the generated compliance framework assessment in security maturity measurement database 1110.

FIG. 13 illustrates a method 1300 for providing a maturity assessment of a plurality of security controls implemented in IT environment 130, according to some embodiments. In some embodiments, method 1300 can be performed by a security system such as security control assessment system 102. For example, one or more steps of method 1300 may be performed by one or more components of security control maturity assessor 128 (e.g., security control maturity assessor 920) and security compliance conformance assessor 110 (e.g., security control compliance conformance assessor 1120) of FIG. 1.

In some embodiments, providing the maturity assessment includes calculating a maturity assessment scores that can be represented by the following mathematical processes. In these calculations, the following definitions of sets and elements are applied:

$e \in$ Events→e is an atomic computation action detected by network and host level monitoring data sources Events$_{current}$=∀e within past time period between $t_0$("now") and $t_{-1}$ Events$_{historical}$=∀e within past time periods $t_{-1}$ to $t_{-n}$ $d \in$ Domains→ d is a network domain within a networked computing environment $a \in$ Assets→a is a device operating on a given network being monitored for e Assets$_{current}$=

∀a with an associated e (i.e., some activity) within the past time period $t_0$ to $t_{-1}$ Assets$_{historical}$=

∀a with an associated e (i.e., some activity) within the past time period $t_{-1}$ to $t_{-n}$ $c \in$ Control where c produces ∃e $f \in$ Compliance_Framework where $f$ requires some set of controls which are ∃c In step 1302, the security system (e.g., security control maturity assessor 920) calculates control effectiveness for a plurality of security controls based on control activity and assets of the IT environment. In some embodiments, calculating the control effectiveness includes calculating a plurality of control effective scores (CES) for a plurality of corresponding domains where each CES measures the effectiveness of a security control over time for a network domain corresponding to the CES. In some embodiments, step 1302 includes steps 1302A-D.

In step 1302A, the security system calculates a control coverage effectiveness ratio (CER) based on the control activity. In some embodiments, the CER measures the ratio of time where a security control was active. For example, the CER may be calculated as follows:

$$CER = \frac{\sum_{i=1}^{n} \text{control active}(t_i)}{n} \text{ where} \quad \text{(Eq. 1)}$$

control$_{active(t)}$ =
$\begin{cases} 0 & \text{if there is no activity for the control in time period } t \\ 1 & \text{if there is activity for the control in time period } t \end{cases}$ and $n$ = the number of time periods observed and n=the number of time periods observed In step 1302B, the security system calculates a control asset coverage ratio (ACR) based on the assets and the control activity. In some embodiments, the ACR measures the hosts covered by a security control versus all of those in a network domain (the logic being that if hosts are not protected by the asset, then control effectiveness cannot be claimed). For example, the ACR may be calculated as follows:

$$ACR = \frac{\text{active assets }(c)}{\text{active assets }(d)} \text{ where} \qquad (Eq. 2)$$

active_hosts($e$) = the number of active hosts in entity $e$

Recall that $c \in$ Controls and $d \in$ Domains.

In step 1302C, the security system calculates a control business impact ratio (BIR) based on the assets and the control activity. In some embodiments, the BIR computes a ratio of the total business impact relative to the maximum possible impact (i.e., worst case) based on a business impact value received for each asset. For example, the BIR may be calculated as follows:

$$BIR = \frac{\sum_{i=1}^{n=|Assets|} \text{business impact}(a)}{\text{Max(business impact score)} * \text{active\_assets}(c)}$$

where business impact(a) returns 0 if there is no business impact, 1 is the impact is low, 2 if the impact is medium, 3 if the impact is high, and 4 if the impact is critical.

In some embodiments, the business impact can be defined based on how a loss of that asset would impact operations of the business. In some embodiments, a loss can refer to a loss in confidentiality, integrity, or availability of the asset, including actions such as destruction, disruption, or denial of service to it. One possible implementation of business impact rankings is provided in Table 1 below, but one familiar in the risk assessment domain could derive other definitions based on various forms of financial loss such as impact on revenue, productivity, and time.

TABLE 1

Business Impact Definitions

| Business Impact | Numeric Score | Definition |
| --- | --- | --- |
| None | 0 | A loss associated with this asset would not affect business operations or corporate value in any way |
| Low | 1 | A type of loss associated with this asset would disrupt business operations for a few person hours to a person day |
| Medium | 2 | A type of loss associated with this asset would disrupt business operations for anywhere from 1-6 person days |
| High | 3 | A type of loss associated with this asset would disrupt business operations for anywhere from 7-14 person days |
| Critical | 4 | The asset is of such importance to business operation that any type of loss associated with it could disrupt operations for an extended period of time (>2 person weeks) |

In step 1302D, the security system calculates a control effectiveness score (CES) based on the CER, the ACR, and the BIR. In some embodiments, calculating the CES includes calculating the control effectiveness ratio (CER) weighted by the control asset coverage ratio (ACR) and subtracting a score corresponding to the portion of the network that was not covered by controls and weighted by business impact. In some embodiments, by considering the portions (e.g., assets) of networks not covered by security controls, network domains where there are more assets not covered and a higher business impact will result in a lower maturity score. For example, the CES may be calculated as follows:

$$\text{Control Effectiveness}_{Coverage}(d) = CER * ACR \qquad (Eq. 4)$$

Control Effectiveness Score($d$) =
$\text{Control Effectiveness}_{Coverage}(d) - ((1 - ACR) * BIR)$ In step 1304, the security system (e.g., security control compliance conformance assessor 1120) calculates compliance conformance of the plurality of security controls with a compliance framework implemented in the IT environment. In some embodiments, the security system calculates the compliance conformance of the plurality of security controls with respect to a plurality of compliance framework implemented in the IT environment. In some embodiments, each compliance framework can require a different set of security controls to be in place for protecting assets.

In some embodiments, the security system can calculate a compliance conformance per compliance framework, f, for each domain, d, configured for IT environment 130. In some embodiments, to calculating a compliance conformance score can include calculating a first score that is an unweighted score (i.e., raw score) and a second score weighted by points assigned to the value of each compliance framework based on their importance specified in the compliance standard. In some embodiments, the unweighted compliance conformance score can measure a ratio of compliance requirements fulfilled (i.e., met) by the security control compared to compliance requirements that must be fulfilled over a predefined time period. In some embodiments, the weighted compliance conformance score can measure a ratio of compliance requirements fulfilled (i.e., met) by the security control compared to compliance requirements that must be fulfilled over the predefined time period where each compliance requirement fulfillment is weighted based on the security control. By assigning such weights, greater importance may be assigned to certain security controls or to certain compliance requirements that have larger impact (e.g., a business impact as defined above) over a predefined period of time.

For example, in the case of the CIS Top 20, the controls may be ordered by importance and grouped based on maturity achieved within the organizations. In this example, 1 point may be for controls 1-5, 2 points may be earned for controls 5-10, 3 points may be earned for controls 11-15, and 4 points may be earned for controls 16-20. Alternatively, when assessing maturity for cyber insurance purposes, the most important controls are those that demonstrate basic health and wellness for IT security. In this example, the order of point values may be reversed (e.g., 4 points for controls 1-5, 3 points for controls 5-10, 2 points for controls 11-15, and 1 point for controls 16-20). In some embodiments, the raw score and the weighted score for compliance conformance can be calculated as follows:

$$\text{Compliance Conformance Raw}(f, d) = \frac{\text{compliance requirements met}}{\text{compliance requirements}}$$

where compliance requirements met is a count of all compliance requirements that have been met because there is a control in place fulfilling that requirement and compliance requirements is the total count of requirements.

$$\text{Compliance Conformance Weighted}(f, d) = \frac{\text{compliance requirement points}}{\text{compliance requirement point total}}$$

where compliance requirement points is the sum of all points for compliance requirements fulfilled given the controls in place and compliance requirement point total is the greatest number of points that can be achieved.

In step 1306, the security system (e.g., security control maturity assessor 920) calculates a plurality of maturity scores for the plurality of security controls based on the calculated control effectiveness and the compliance conformance for each security control. In some embodiments, the control maturity score for a security control can be calculated by multiplying control effectiveness by compliance conformance, as shown below:

$$\text{Control Maturity} = \text{Control Effectiveness} * \text{Compliance Conformance} \quad \text{(Eq. 7)}$$

As described above, the control effectiveness may quantify whether the security control is in place and doing its job, while compliance conformance may quantify whether and how much the security control fulfills compliance requirements. Together, the control effectiveness and the compliance conformance may provide an indication as to how well compliance is being met with the controls in place.

In some embodiments, to prioritize which domains should be addressed with improved or added security controls, the security system can be configured to calculate normalized scores for control effectiveness and compliance conformance. By normalizing these scores, the scores for a plurality of network domains can be configured. In some embodiments, based on the normalized scores, the security system can calculate the changes that will have the greatest effect with respect to asset coverage and business impact. In some embodiments, to calculate the normalized scores, the security system can perform method 1300, but instead calculate normalized values.

In some embodiments, instead of calculating the CER in step 1302A, the security system can be configured to calculate a normalized control effectiveness ratio (NCER) according to the following process:

$$NCER(d) = \frac{CER(d)}{\max(\{CER(x): x = 1 \ldots |\text{Domains}|\})} \quad \text{(Eq. 8)}$$

In some embodiments, instead of calculating ACR in step 1302B, the security system can be configured to calculate a normalized asset coverage ratio (NACR) according to the following process:

$$NACR(d) = \frac{ACR(d)}{\max(\{ACR(x): x = 1 \ldots |\text{Domains}|\})} \quad \text{(Eq. 9)}$$

In some embodiments, instead of calculating BIR in step 1302C, the security system can be configured to calculate a normalized control normalized business impact ratio (NBIR) according to the following process:

$$NBIR(d) = \frac{BIR(d)}{\max(\{BIR(x): x = 1 \ldots |\text{Domains}|\})} \quad \text{(Eq. 10)}$$

In some embodiments, instead of calculating CES in step 1302D, the security system can be configured to calculate a normalized control effectiveness score (NCES). To calculate the NCES, the security system can weight the NCER by NACR, then use that intermediate score and the NBIR to produce the NCES. For example, the NCES may be calculated as follows:

$$\text{Weighted } NCER(d) = NCER(d) * NACR(d)$$

$$\text{Normalized } CES(d) = \text{Weighted } NCER(d) - ((1 - NACR(d)) * NBIR(d)) \quad \text{(Eq. 11)}$$

In some embodiments, the security system can be configured to generate a sorted list of the Normalized CES per domain values to prioritize the network domains that should have their security control improvement plans addressed first to provide the greatest effect with respect to asset coverage and business impact. In some embodiments, the security system can be configured to generate security recommendations that include the top (e.g., a predetermined number) security controls from the sorted list to be addressed first.

In some embodiments, the control maturity score for a security control can be calculated as a normalized control maturity score by multiplying a normalized control effectiveness (i.e., NCES) by the weighted compliance conformance, as shown below:

$$\text{Normalized Control Maturity} = \text{Normalized Control Effectiveness} * \text{Weighted Compliance Conformance} \quad \text{(Eq. 12)}$$

Figure 14:
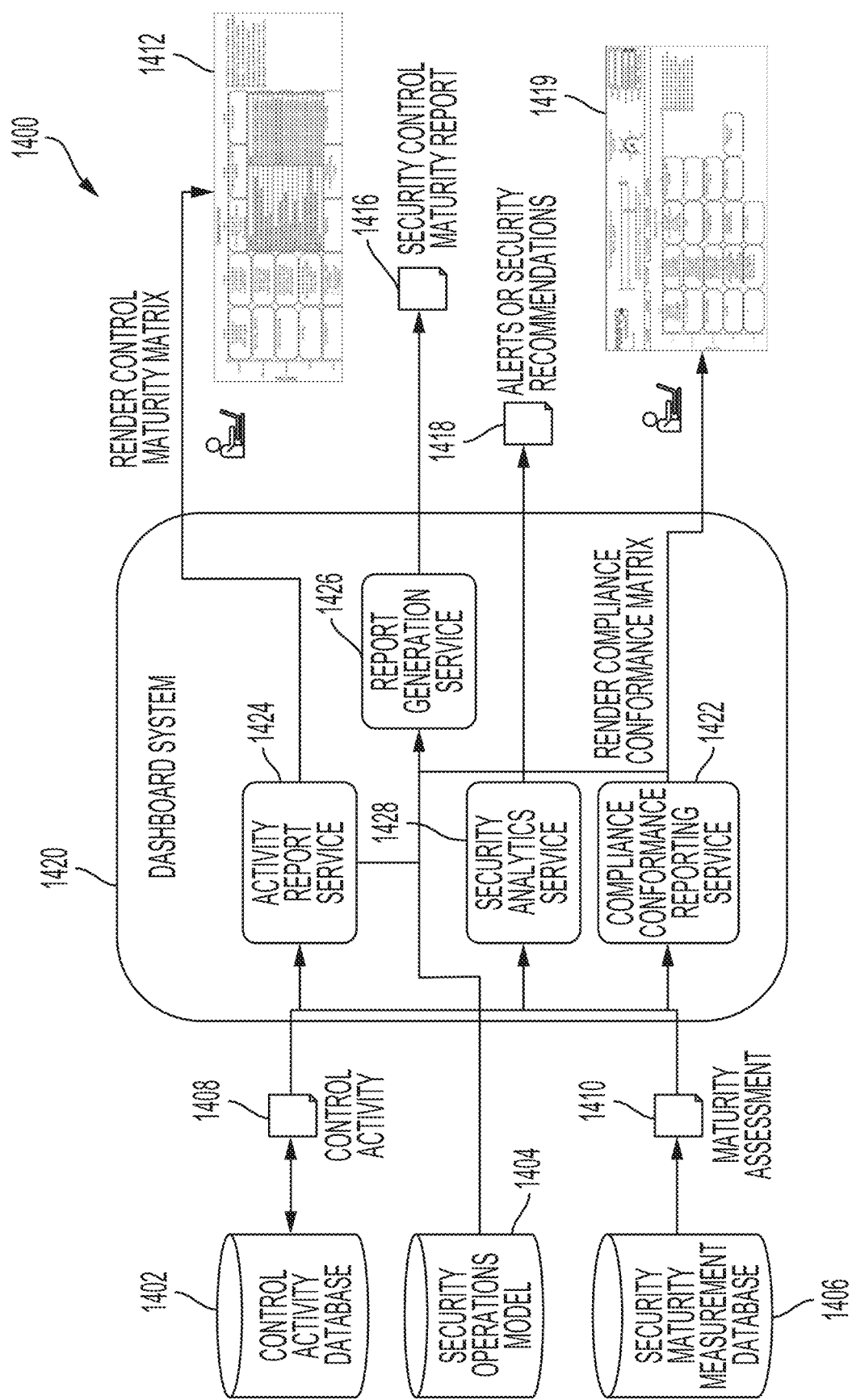
FIG. 14 illustrates a diagram 1400 showing components of a dashboard system in the security control assessment system, according to some embodiments.

FIG. 14 illustrates a diagram 1400 showing components of a dashboard system 1420 in a security control assessment system (e.g., security control assessment system 102), according to some embodiments. In some embodiments, dashboard system 1420 can be an example implementation of dashboard system 114 of FIG. 1 and configured to render a user interface and generate reports through programmatic and visual interfaces to provide a user (e.g., a user of user device 140) with security controls assessment results performed by a security control assessment system (e.g., security control assessment system 102) for an IT environment 130. In some embodiments, dashboard system 1420 can be configured to provide one or more graphical user interfaces to the user to enable the user to view and interactive with the reports generated by dashboard system 1420. For example, the one or more graphical user interfaces may be provided through a web-based user interface. In some embodiments, dashboard system 1520 can also notify the user of alerts or security recommendations through the one or more graphical user interfaces. In some embodiments, dashboard system 1420 can transmit the reports, alerts, or security recommendations via a wired or wireless communication network. To provide these programmatic and visual interfaces, dashboard system 1420 can include the following components: activity report service 1424, report generation service 1426, security analytics service 1428, and compliance conformance reporting service 1422.

In some embodiments, activity report service 1424 can be configured to provide to the user a graphical user interface 1412 that renders control activity data on a displayed control maturity matrix. In some embodiments, activity report service 1424 can retrieve control activity data 1408 (e.g., control activity records) from control activity database 1402. As described above, the maturity matrix may be configured to cross operational functions with asset classes. In some embodiments, activity report service 1424 can be configured to generate the control maturity matrix based on the mappings between security controls and a pair of an operational function and an asset class stored in security operations model 1404.

In some embodiments, activity report service 1424 generates a report that includes the control activity data 1408 or maturity assessment 1410 in response to receiving a request from the user (i.e., on demand). In some embodiments, activity report service 1424 can generate the report at scheduled intervals (e.g., every hour, every fifteen minutes, every day, etc.). In some embodiments, the report can be a textual report or a visual report including the control maturity matrix.

In some embodiments, each cell of the maturity matrix can include one or more security controls classified to the operational function and the asset class corresponding to that cell. In some embodiments, by providing the visualization of control activity data within the control maturity matrix, activity report service 1424 enables the user to see control activity data evolve over a time period of data collection so that security control gaps can be more easily identified. In some embodiments, activity report service 1424 can be configured to generate snapshots of the control activity data for automated report generation.

In some embodiments, the rendered control maturity matrix can be configured to be display statuses of the security controls corresponding to the cells of the control maturity matrix. In some embodiments, the statuses can include whether a security control is: deployed or not deployed, active or inactive, or compliant or not compliant with compliance frameworks. In some embodiments, graphical user interface 1412 provided by activity report service 1424 can be configured to display an indication in each cell of the control maturity matrix to indicate one or more statuses of the one or more security controls mapped to that cell. In some embodiments, the indication can be a color. In some embodiments, the indication can represent a plurality of statuses. For example, graphical user interface 1412 may assign a cell to the color of red if any of the security controls mapped to that cell is not deployed, not activity, and required for compliance. In contrast, graphical user interface 1412 may assign a cell to the color of light green if at least one security control mapped to that cell is deployed, active, and required for compliance.

In some embodiments, compliance conformance reporting service 1422 can be configured to provide to the user a graphical user interface 1419 that renders compliance conformance data on a displayed control maturity matrix. In some embodiments, compliance conformance reporting service 1422 generates a report that includes the compliance conformance data in response to receiving a request from the user (i.e., on demand). In some embodiments, compliance conformance reporting service 1422 can generate the report at scheduled intervals (e.g., every hour, every fifteen minutes, every day, etc.). In some embodiments, the report can be a textual report or a visual report including the compliance conformance matrix.

In some embodiments, compliance conformance reporting service 1422 can retrieve compliance conformance data from security maturity measurement database 1406. As described above, the control maturity matrix may be configured to cross operational functions (i.e., a first axis) with asset classes (i.e., a second axis). In some embodiments, compliance conformance reporting service 1422 can be configured to generate the compliance conformance matrix based on the mappings between security controls and a pair of an operational function and an asset class stored in security operations model 1404. In some embodiments, each cell of the displayed compliance maturity matrix can include one or more security controls classified to the operational function and the asset class corresponding to that cell. In some embodiments, by providing the visualization of compliance conformance data within the compliance conformance matrix, compliance conformance reporting service 1422 enables the user to see control covers versus compliance requirements over a time period of data collection so that security control gaps in meeting requirements can be more easily identified. In some embodiments, compliance conformance reporting service 1422 can be configured to generate snapshots of the compliance conformance data for automated report generation.

In some embodiments, report generation service 1426 can be configured generate a security control maturity report 1416 based on data received from activity report service 1424 and compliance conformance reporting service 1422. In some embodiments, report generation service 1426 can map the received data to operational functions and asset classes in security operations model 1404 based on a security control corresponding to the receive data. In some embodiments, security control maturity report 1416 can be stored for later review.

In some embodiments, security analytics service 1428 can be configured to generate security alerts or security recommendations 1418 for security configuration improvements to IT environment 130 based on maturity assessment 1410 and control activity data 1408 received from security maturity measurement database 1406 and control activity database 1402, respectively. In some embodiments, security analytics service 1428 can implement an application program interface (API) that enables external systems to retrieve alerts or security recommendations 1418 for manual or automated security orchestration processes.

In some embodiments, security analytics service 1428 can operate on the streams of data (i.e., control activity data 1408 or maturity assessment 1410) in real time to generate a security alert notifying the user of time periods of misconfiguration, drops in maturity score (e.g., a drop exceeding a predetermined value), or other indicators of security concern. For example, the generated security alert may indicate gaps in control maturity or compliance conformance, a change (e.g., a decrease or increase) in overall control maturity or compliance conformance, or a change (e.g., a decrease or an increase) for specific security controls or in specific network domains (i.e., at an organizational-unit specific level). In some embodiments, security analytics service 1428 can detect an indication of an abnormal change in the control maturity or compliance conformance based on a plurality of rules (e.g., a rule that specific a change exceeding a predefined threshold is abnormal), heuristics, classifiers (e.g., a neural net, an SVM, a probabilistic classifier such as a Bayes classifier, etc.), or other mechanisms available to those with skill in the art. As described, the abnormal change may be calculated based on an overall or an organizational-unit specific (e.g., domain level) control maturity or compliance conformance assessment.

In some embodiments, security analytics service 1428 can generate the alert to the user if, for example, the calculated control maturity falls below a pre-determined threshold (e.g., an example rule), a change in the calculated control maturity is negative (e.g., another example rule), a change in the calculated control maturity exceeds a pre-determined threshold (e.g., another example rule), or a combination thereof.

In some embodiments, security analytics service 1428 can be configured analyze security configuration data in relation to compliance and maturity requirements to provide rank-ordered recommendations of changes to existing security policy or additions of new security infrastructure to improve the outcome of future maturity assessments 1410. In some embodiments, recommendations to improve cybersecurity can include enhancing existing and adding new controls, specifying a suggested timeline for introducing those controls, document gaps in compliance, or a combination thereof.

In some embodiments, security analytics service 1428 can analyzes previous recommendations to determine how changes in security posture have improved maturity measurement scores over time. In some embodiments, the various analysis performed by security analytics service 1428 can be included in security control maturity report 1416 generated by report generation service 1426.

In some embodiments, security analytics service 1428 can be configured to initiate automated security orchestration actions to change the posture of IT environment 130 based on the calculated control maturity, a generated alert, a generated recommendation, a detected indication associated with the control maturity, or a combination thereof. In some embodiments, by initiating an automated action responsive to the calculated control maturity, security analytics service 1428 can be configured to change the security posture of IT environment 130 to decrease risk and improve security resilience. In some embodiments, the automated action can apply to the entire IT environment 130 or to organization-unit specific domains (e.g., a network domain or unit). In some embodiments, security analytics service 1428 can be configured to initiate the automated action in response to a generated security alert. For example, the automated action may be initiated if the calculated control maturity falls below a predetermined threshold (which may prompt the security alert).

In some embodiments, the automated action can include reconfiguring one or more security policies, one or more settings for sensors, or rules for assessing impact severity of certain security events. For example, reconfiguring a security policy may include changing a firewall policy to disallow certain types of traffic, prohibiting information flow to or from selected internal or external network destinations, or disallowing certain types of access to hosts using a host access control system. For example, reconfiguring the one or more settings or rules may include increasing a severity of output from security assessment tools such as a security information and event management (STEM) software products.

Figure 15:
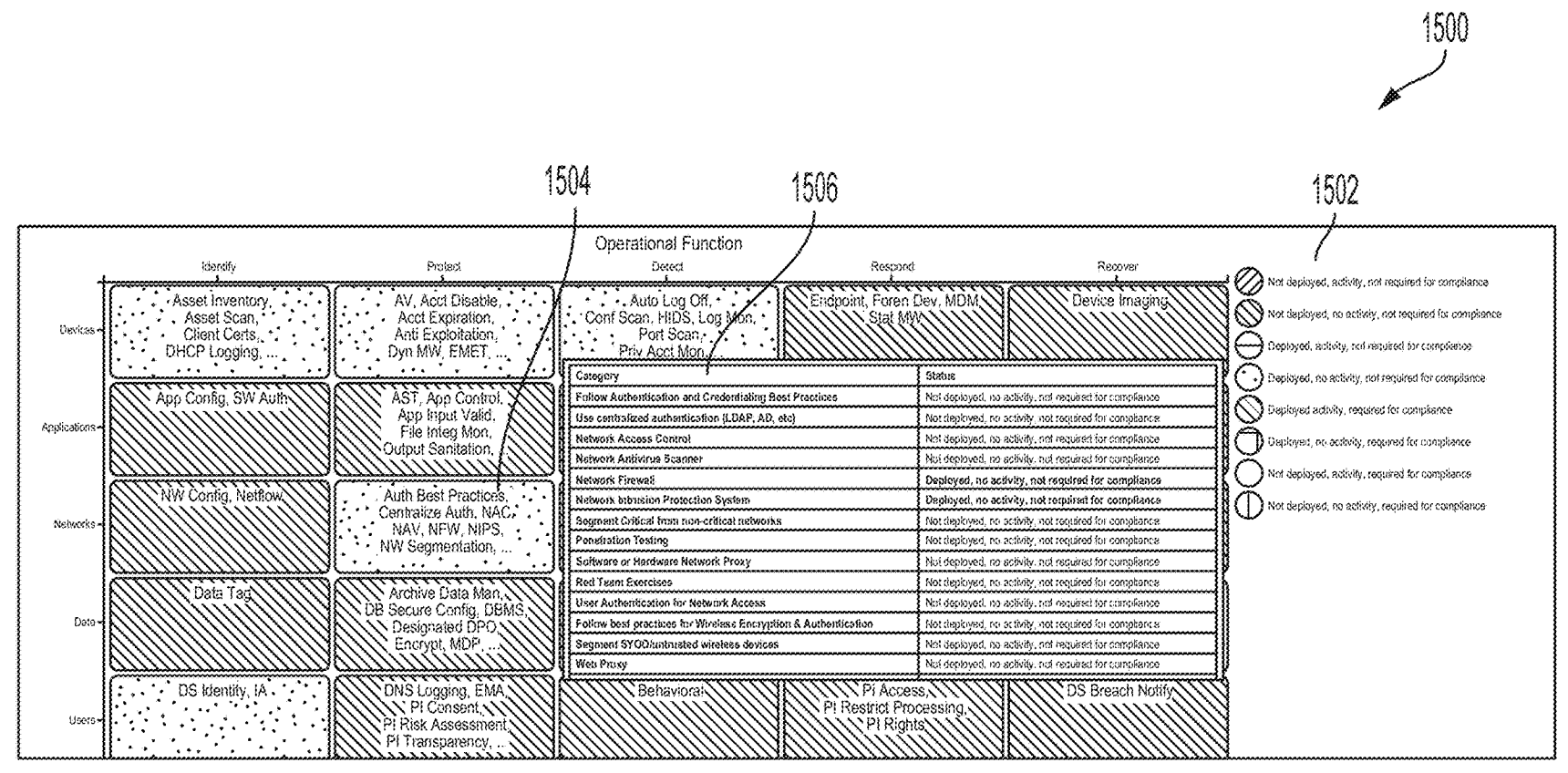

FIG. 15 illustrates an example graphical user interface 1500 that displays a control maturity matrix rendered by a dashboard system (e.g., activity report service 1424 of dashboard system 1420), according to some embodiments. As shown in the control maturity matrix, each cell crosses an asset class with an operational function and each cell maps to one or more security controls. Additionally, the dashboard system may render a color in each cell to indicate to a user a plurality of statuses for the security controls mapped to that cell. In some embodiments, graphical user interface 1500 includes a legend 1502 that describes the plurality of statuses associated with each indication. In some embodiments, in response to receiving a selection from a user for a cell, e.g., cell 1504, graphical user interface 1500 can be configured to display a plurality of statuses corresponding to a plurality of security controls mapped to that cell in a separate window (e.g., window 1506). For example, in response to receiving cell 1504 corresponding to security controls that protect (i.e., an example operational function) network assets (e.g., an example asset class), graphical user interface 1500 displays window 1506 that displays a plurality of indications corresponding to the plurality of security controls mapped to cell 1504.

Figure 16:
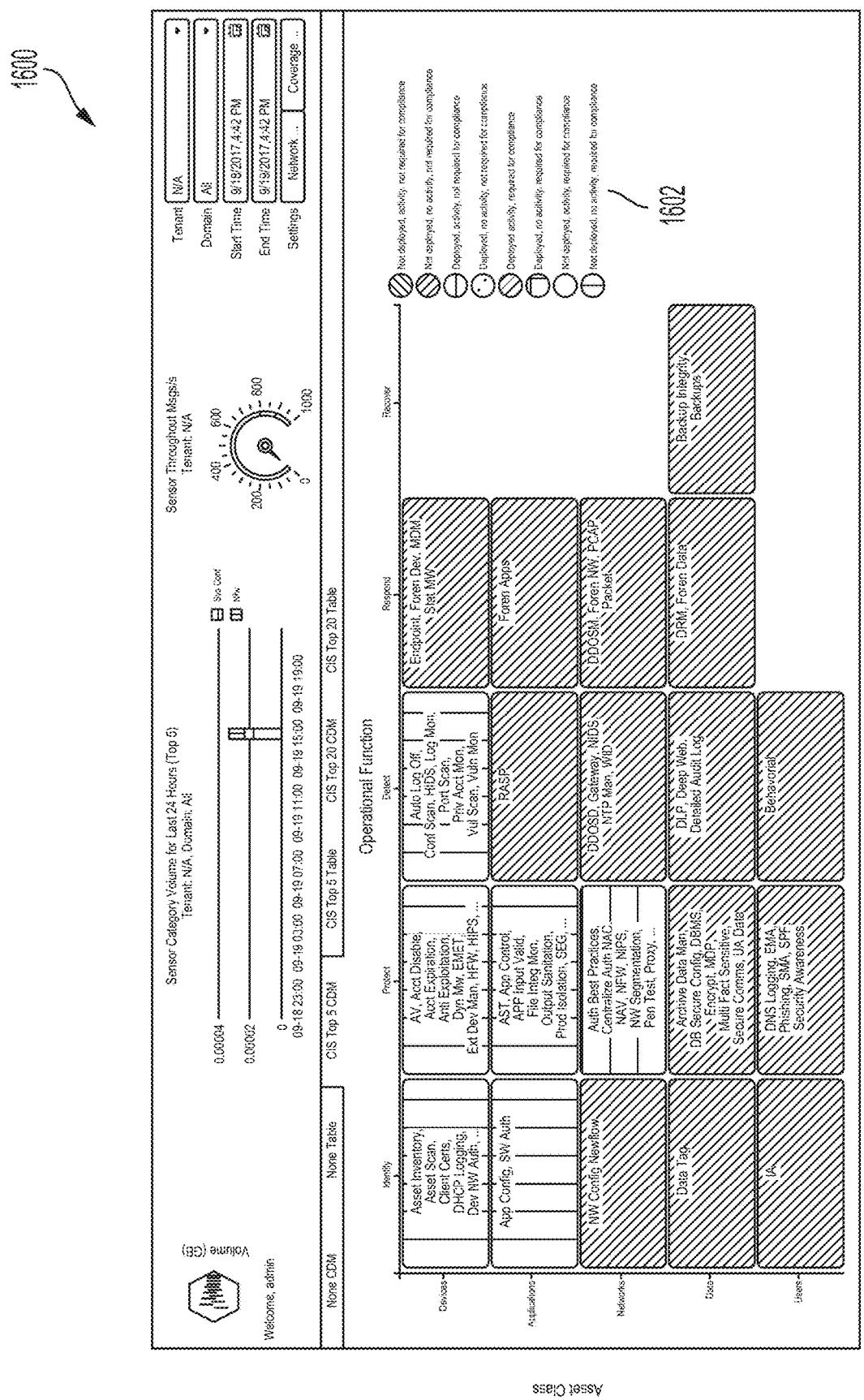
FIG. 16 illustrates an example graphical user interface that displays a compliance conformance matrix rendered by a dashboard system, according to some embodiments.

FIG. 16 illustrates an example graphical user interface 1600 that displays a compliance conformance matrix rendered by a dashboard system (e.g., compliance conformance reporting service 1422 of dashboard system 1420), according to some embodiments. As shown in the compliance conformance matrix, each cell crosses an asset class with an operational function and each cell maps to one or more security controls. Additionally, the dashboard system may render a color in each cell to indicate to a user a plurality of statuses for the security controls mapped to that cell. In some embodiments, graphical user interface 1600 includes a legend 1602 that describes the plurality of statuses associated with each indication. In some embodiments, in response to receiving a selection from a user for a cell, graphical user interface 1600 can be configured to display a plurality of statuses corresponding to a plurality of security controls mapped to that cell in a separate window.

Figure 17:
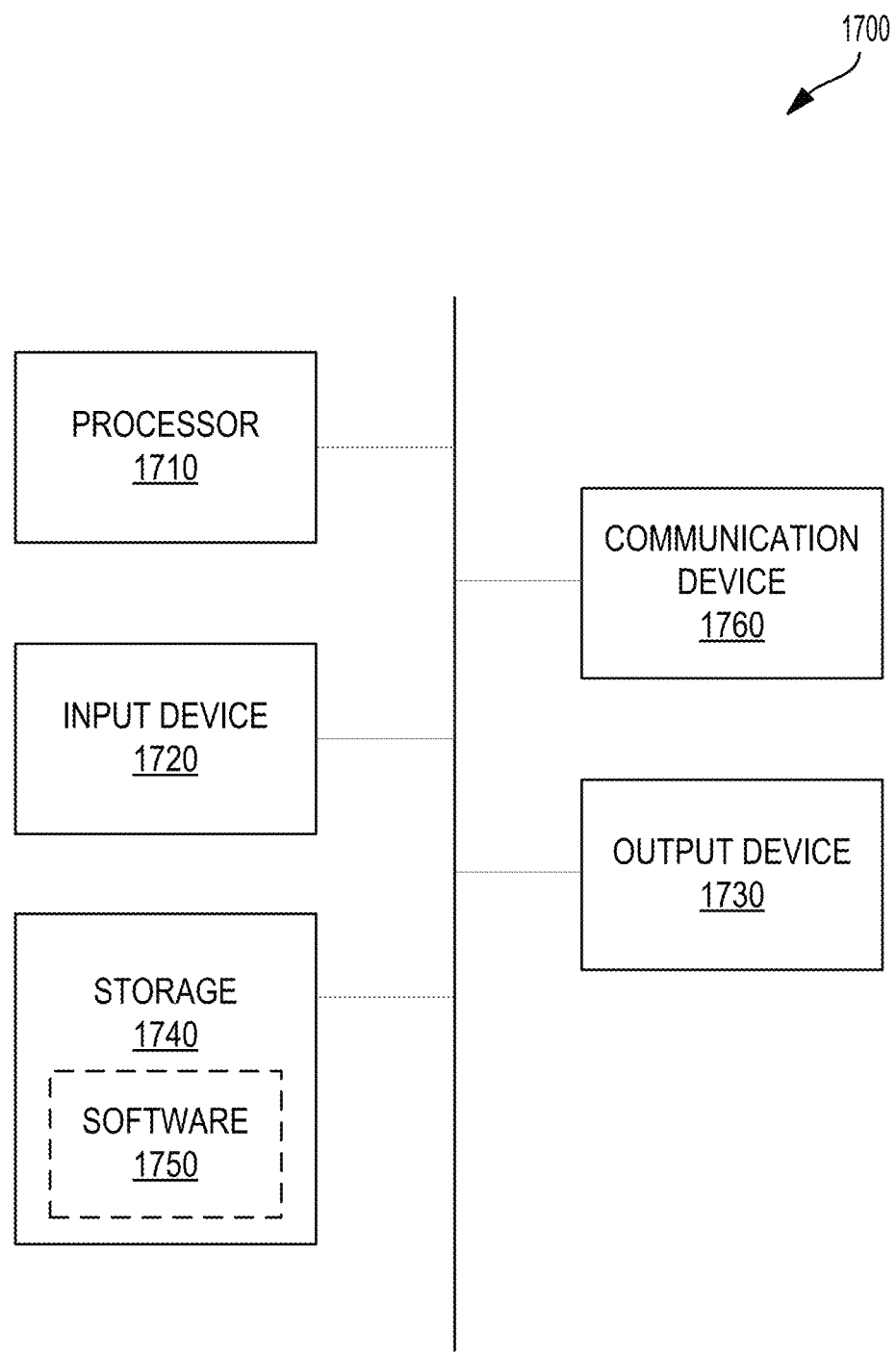
FIG. 17 illustrates an example of a computer, according to some embodiments.

FIG. 17 illustrates an example of a computer 1700, according to some embodiments. Computer 1700 can be a component of a system for providing security controls assessment according to the systems and methods described above, such as any of components of security control assessment system 102 as described with respect to FIG. 1. In some embodiments, computer 1700 is configured to execute one or more of methods 200, 600, 800, 1000, 1200, and 1300 of FIGS. 2, 6, 8, 10, 12, and 13, respectively.

Computer 1700 can be a host computer connected to a network. Computer 1700 can be a client computer or a server. As shown in FIG. 17, computer 1700 can be any suitable type of microprocessor-based device, such as a personal computer, workstation, server, videogame console, or handheld computing device, such as a phone or tablet. The computer can include, for example, one or more of processor 1710, input device 1720, output device 1730, storage 1740, and communication device 1760. Input device 1720 and output device 1730 can generally correspond to those described above and can either be connectable or integrated with the computer.

Input device 1720 can be any suitable device that provides input, such as a touch screen or monitor, keyboard, mouse, or voice-recognition device. Output device 1730 can be any suitable device that provides output, such as a touch screen, monitor, printer, disk drive, or speaker.

Storage 1740 can be any suitable device that provides storage, such as an electrical, magnetic, or optical memory, including a RAM, cache, hard drive, CD-ROM drive, tape drive, or removable storage disk. Communication device 1760 can include any suitable device capable of transmitting and receiving signals over a network, such as a network interface chip or card. The components of the computer can be connected in any suitable manner, such as via a physical bus or wirelessly. Storage 1740 can be a non-transitory computer-readable storage medium comprising one or more programs, which, when executed by one or more processors, such as processor 1710, cause the one or more processors to execute methods described herein, such as each of methods 200, 600, 800, 1000, 1200, and 1300 of FIGS. 2, 6, 8, 10, 12, and 13, respectively.

Software 1750, which can be stored in storage 1740 and executed by processor 1710, can include, for example, the programming that embodies the functionality of the present disclosure (e.g., as embodied in the systems, computers, servers, and/or devices as described above). In some embodiments, software 1750 can be implemented and executed on a combination of servers such as application servers and database servers.

Software 1750, or part thereof, can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 1740, that can contain or store programming for use by or in connection with an instruction execution system, apparatus, or device.

Software 1750 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

Computer 1700 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 1700 can implement any operating system suitable for operating on the network. Software 1750 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description sets forth exemplary methods, parameters and the like. It should be recognized, however, that such description is not intended as a limitation on the scope of the present disclosure but is instead provided as a description of exemplary embodiments. The illustrative embodiments described above are not intended to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. In the foregoing description of the disclosure and embodiments, reference is made to the accompanying drawings, in which are shown, by way of illustration, specific embodiments that can be practiced. It is to be understood that other embodiments and examples can be practiced, and changes can be made without departing from the scope of the present disclosure.

Although the foregoing description uses terms first, second, etc. to describe various elements, these elements should not be limited by the terms. These terms are only used to distinguish one element from another.

In addition, it is also to be understood that the singular forms "a," "an," and "the" used in the foregoing description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

In some embodiments, a non-transitory computer readable storage medium stores one or more programs configured to be executed by one or more processors of a computing device, the one or more programs including instructions for implementing any of the steps described or claimed herein. The present disclosure also relates to a device for performing the operations herein. This device may be specially constructed for the required purposes, or it may include a general purpose computer selectively activated or reconfigured by a computer program stored in the computer. Such a computer program may be stored in a non-transitory, computer readable storage medium, such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referenced in this disclosure may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description above. In addition, the present disclosure is not described with reference to any particular programming language. It will be appreciated that a variety of programming languages may be used to implement the teachings of the present disclosure as described herein.

What is claimed is:

1. A method for assessing a control maturity of a plurality of security controls implemented in an Information Technology (IT) environment, comprising:
receiving a plurality of security events from a plurality of sensors in the IT environment;
generating a plurality of enriched events corresponding to the plurality of security events,
wherein each of the plurality of enriched events comprises metadata identifying data types associated with a security event corresponding to a respective one of the plurality of enriched events;
classifying each of the plurality of security events to a respective one of a plurality of predetermined security controls based on the corresponding enriched event to yield a plurality of classified security events;
calculating a plurality of activity metrics for each of the plurality of predetermined security controls based on each of the plurality of classified security events;
calculating the control maturity for the plurality of predetermined security controls based on the plurality of activity metrics; and
providing the calculated control maturity to a user.

2. The method of claim 1, wherein the IT environment comprises a plurality of assets associated with a plurality of network domains, and wherein each sensor is configured to detect a type of security information associated with an asset within a network domain.

3. The method of claim 1, wherein the metadata comprises a network ID, a network domain, a timestamp, sensor event type data, a sensor vendor type, event severity data, or security metadata associated with event assessment and security control activity calculations.

4. The method of claim 1, wherein generating the plurality of enriched events comprises:
matching a plurality of portions of the security event to a plurality of event patterns stored in an event pattern database to determine a matching event pattern; and
in response to matching the plurality of portions to the event pattern, generating the metadata for each matching portion based on the data types specified in the event pattern.

5. The method of claim 4, wherein the plurality of event patterns comprises a plurality of corresponding regular expressions.

6. The method of claim 1, wherein classifying each of the plurality of security events comprises:
classifying each of the plurality of security events to a sensor vendor based on the metadata corresponding to the security event; and
classifying each of the plurality of security events to a respective one of the plurality of predetermined security controls based on the sensor vendor classified for the security event.

7. The method of claim 1, wherein classifying each of the plurality of security events to a respective one of the plurality of predetermined security controls based on the corresponding enriched event comprises:
classifying of the plurality of security events to an operational function based on a security control associated with the security event; and
classifying the security event as having an impact on one or more assets that are associated with the respective one of the plurality of predetermined security controls.

8. The method of claim 1, wherein calculating the plurality of activity metrics for each of the plurality of predetermined security controls:
generating a plurality of control activity records corresponding to the plurality of predetermined security controls based on each of the plurality of classified security events,
wherein each control activity record includes an activity count associated with a security control type; and
storing the plurality of control activity records in a control activity database.

9. The method of claim 1,
wherein calculating the control maturity comprises calculating a control maturity score for at least one of the plurality of predetermined security controls, and
wherein calculating the control maturity score comprises:
calculating a control effectiveness score (CES) that measures an effectiveness of the at least one of the plurality of predetermined security controls over a predefined time period; and
calculating a compliance conformance score (CCS) that measures how well compliance is being met for the at least one of the plurality of predetermined security controls in place.

10. The method of claim 9, wherein calculating the control effectiveness score (CES) comprises:
calculating a coverage effectiveness ratio (CER) that measures a ratio of time that the security control was active in a predefined time period;
calculating an asset coverage ratio (ACR) that measures assets covered by a security control versus a total number of the assets in a network domain; and
calculating a business impact ratio (BIR) that computes a ratio of a total business impact relative to a maximum possible impact based on the assets covered by the security control and a business impact assigned to each asset.

11. The method of claim 10,
wherein the CES is calculated by weighting the CER by the ACR and subtracting a value calculated based on weighting an uncovered ratio by the BIR,
wherein the uncovered ratio is calculated based on the ACR and represents a portion of the network domain not covered by the security control.

12. The method of claim 9, wherein calculating the compliance conformance score (CCS) comprises:
calculating an unweighted compliance conformance score (UCCS) that measures a ratio of compliance requirements fulfilled by the security control compared to other compliance requirements that must be fulfilled over the predefined time period.

13. The method of claim 1, wherein providing the calculated control maturity to the user comprises:
displaying a matrix of operational assets crossed with asset classes,
wherein each cell in the matrix comprises one or more of the plurality of predetermined security controls mapped to an operational asset and an asset class corresponding to the cell; and
displaying a graphical indication within the cell of the matrix to indicate the calculated control maturity of the one or more of the plurality of predetermined security controls corresponding to the cell.

14. The method of claim 1, wherein providing the calculated control maturity to the user comprises:

providing to the user a report that indicates control maturity gaps with respect to a matrix of operational assets crossed with asset classes, wherein each cell in the matrix comprises one or more of the plurality of predetermined security controls mapped to an operational asset and an asset class corresponding to the cell.

15. The method of claim 1, comprising: generating a security alert based on the calculated control maturity to notify the user of control maturity gaps or to notify the user of an abnormal change in the control maturity or a compliance conformance.

16. The method of claim 15, comprising: detecting an indication of the abnormal change based on a plurality of rules, a heuristic, or a classifier.

17. The method of claim 1, comprising: initiating an automated action based on the calculated control maturity to decrease risk and improve security resilience of the IT environment.

18. The method of claim 17, wherein the automated action comprises reconfiguring one or more security policies.

19. The method of claim 1, comprising: generating a model of a security environment corresponding to the IT environment.

20. A system for assessing a control maturity of security controls in an Information Technology (IT) environment, comprising one or more processors, memory, and one or more programs stored in the memory that when executed by the one or more processors cause the one or more processors to:

receive a plurality of security events from a plurality of sensors in the IT environment;

generate a plurality of enriched events corresponding to the plurality of security events, wherein each enriched event comprises metadata identifying data types associated with a security event corresponding to the enriched event;

classify each of the plurality of security events to a respective one of a plurality of predetermined security controls based on the corresponding enriched event to yield a plurality of classified security events;

calculate a plurality of activity metrics for each of the plurality of predetermined security controls based on each of the plurality of classified security events; and calculate the control maturity for each of the plurality of predetermined security controls based on the plurality of activity metrics; and provide the calculated control maturity to a user.

21. The system of claim 20, wherein the IT environment comprises a plurality of assets associated with a plurality of network domains, and wherein each sensor is configured to detect a type of security information associated with an asset within a network domain.

22. The system of claim 20, wherein the metadata comprises a network ID, a network domain, a timestamp, sensor event type data, a sensor vendor type, event severity data, or security metadata associated with event assessment and security control activity calculations.

23. The system of claim 20, wherein to generate the plurality of enriched events, the one or more processors are caused to:

match a plurality of portions of the security event to a plurality of event patterns stored in an event pattern database to determine a matching event pattern; and in response to matching the plurality of portions to the event pattern, generate the metadata for each matching portion based on the data types specified in the event pattern.

24. The system of claim 23, wherein the plurality of event patterns comprises a plurality of corresponding regular expressions.

25. The system of claim 20, wherein to classify each of the plurality of security events, the one or more processors are caused to:

classify each of the plurality of security events to a sensor vendor based on the metadata corresponding to each of the plurality of security events; and classify each of the plurality of security events to the respective one of the plurality of predetermined security controls based on the sensor vendor classified for the security event.

26. The system of claim 20, wherein to classify each of the plurality of security events to a respective one of the plurality of predetermined security controls based on the corresponding one of the plurality of enriched events, the one or more processors are caused to:

classify each of the plurality of security events to an operational function based on the security control associated with the security event; and classify each of the plurality of security events as having an impact on one or more assets that are associated with the respective one of the plurality of predetermined security controls.

27. The system of claim 20, wherein to calculate the plurality of activity metrics for each of the plurality of predetermined security controls, the one or more processors are caused to:

generate a plurality of control activity records corresponding to the plurality of predetermined security controls based on each of the plurality of classified security events, wherein each of the plurality of control activity records includes an activity count associated with a security control type; and store the plurality of control activity records in a control activity database.

28. The system of claim 20, wherein calculating the control maturity comprises calculating a control maturity score for a security control, and wherein to calculate the control maturity score, the one or more processors are caused to:

calculate a control effectiveness score (CES) that measures an effectiveness of the security control over a predefined time period; and calculate a compliance conformance score (CCS) that measures how well compliance is being met for the security control in place.

29. The system of claim 28, wherein to calculate the control effectiveness score (CES), the one or more processors are caused to:

calculate a coverage effectiveness ratio (CER) that measures a ratio of time that the security control was active in a predefined time period;

calculate an asset coverage ratio (ACR) that measures assets covered by the security control versus a total number of the assets in a network domain; and calculate a business impact ratio (BIR) that computes a ratio of a total business impact relative to a maximum possible impact based on the assets covered by the security control and a business impact assigned to each asset.

30. The system of claim 29,
wherein the CES is calculated by weighting the CER by the ACR and subtracting a value calculated based on weighting an uncovered ratio by the BIR,
wherein the uncovered ratio is calculated based on the ACR and represents a portion of the network domain not covered by the security control.

31. The system of claim 28, wherein to calculate the compliance conformance score (CCS), the one or more processors are caused to:
calculate an unweighted compliance conformance score (UCCS) that measures a ratio of compliance requirements fulfilled by the security control compared to other compliance requirements that must be fulfilled over the predefined time period.

32. The system of claim 28, wherein to calculate the compliance conformance score (CCS), the one or more processors are caused to:
calculate a weighted compliance conformance that measures a ratio of compliance requirements fulfilled by the security control compared to other compliance requirements that must be fulfilled over the predefined time period,
wherein each compliance requirement fulfillment is weighted based on the security control.

33. The system of claim 20, wherein to provide the calculated control maturity to the user, the one or more processors are caused to:
display a matrix of operational assets crossed with asset classes,
wherein each cell in the matrix comprises one or more of the plurality of predetermined security controls mapped to an operational asset and the asset class corresponding to the cell; and
display a graphical indication within the cell of the matrix to indicate the calculated control maturity of the one or more of the plurality of predetermined security controls corresponding to the cell.

34. The system of claim 20, wherein to provide the calculated control maturity to the user, the one or more processors are caused to:
provide to the user a report that indicates control maturity gaps with respect to a matrix of operational assets crossed with asset classes,
wherein each cell in the matrix comprises one or more of the plurality of predetermined security controls mapped to an operational asset and an asset class corresponding to the cell.

35. The system of claim 20, wherein the one or more processors are caused to: generate a security alert based on the calculated control maturity to notify the user of control maturity gaps or to notify the user of an abnormal change in the control maturity or a compliance conformance.

36. The system of claim 35, wherein the one or more processors are caused to: detect an indication of the abnormal change based on a plurality of rules, a heuristic, or a classifier.

37. The system of claim 20, wherein the one or more processors are caused to: initiate an automated action based on the calculated control maturity to decrease risk and improve security resilience of the IT environment.

38. The system of claim 37, wherein the automated action comprises reconfiguring one or more security policies.

39. The system of claim 20, wherein the one or more processors are caused to generate a model of a security environment corresponding to the IT environment.

40. A non-transitory computer-readable storage medium comprising instructions for assessing a control maturity of security controls in an Information Technology (IT) environment, wherein the instructions, when executed by a computer having one or more processors, cause the one or more processors to perform the instructions comprising:
receiving a plurality of security events from a plurality of sensors in the IT environment;
generating a plurality of enriched events corresponding to the plurality of security events,
wherein each enriched event comprises metadata identifying data types associated with a security event corresponding to the enriched event;
classifying each of the plurality of security events to a security control from a plurality of predetermined security controls based on the corresponding enriched event to yield a plurality of classified security events;
calculating a plurality of activity metrics for each of the plurality of predetermined security controls based on each of the plurality of classified security events; and
calculating the control maturity for the plurality of predetermined security controls based on the plurality of activity metrics; and
providing the calculated control maturity to a user.

* * * * *